(12) United States Patent
Kim et al.

(10) Patent No.: US 9,736,236 B2
(45) Date of Patent: Aug. 15, 2017

(54) SYSTEM AND METHOD FOR MANAGING BUFFERING IN PEER-TO-PEER (P2P) BASED STREAMING SERVICE AND SYSTEM FOR DISTRIBUTING APPLICATION FOR PROCESSING BUFFERING IN CLIENT

(75) Inventors: Young Wook Kim, Seongnam-si (KR); Jong Soo Kim, Seongnam-si (KR); Jung Jun Park, Seongnam-si (KR); Seung Kwan Yang, Seongnam-si (KR); Jae Won Oh, Seongnam-si (KR); Chang Hee Woo, Seongnam-si (KR); Sang Hyun Lee, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 469 days.

(21) Appl. No.: 13/353,582

(22) Filed: Jan. 19, 2012

(65) Prior Publication Data
US 2013/0024583 A1  Jan. 24, 2013

(30) Foreign Application Priority Data

Jan. 19, 2011  (KR) ................. 10-2011-0005342
Jan. 20, 2011  (KR) ................. 10-2011-0005923

(51) Int. Cl.
  *H04L 29/08* (2006.01)
  *H04N 21/236* (2011.01)
  (Continued)

(52) U.S. Cl.
  CPC .......... *H04L 67/104* (2013.01); *H04L 65/607* (2013.01); *H04N 21/236* (2013.01); *H04N 21/8456* (2013.01); *H04N 21/6377* (2013.01)

(58) Field of Classification Search
  CPC ............................. H04N 21/44; H04N 21/63
  (Continued)

(56) References Cited

U.S. PATENT DOCUMENTS 5,233,603 A    8/1993  Takeuchi et al.
7,710,973 B2   5/2010  Rumbaugh et al.
(Continued)

FOREIGN PATENT DOCUMENTS

JP   11312030       9/1999
JP   2002208953 A   7/2002
(Continued)

OTHER PUBLICATIONS

NPL1: Title-Peer-to-Peer Multimedia Streaming Using BitTorrent; (1-4244-1338-6/07/$25.00/© 2007 IEEE); Shah/Jehan-Francois-Paris, by Purvi.*

(Continued)

*Primary Examiner* — Kevin Bates
*Assistant Examiner* — Chen-Liang Huang
(74) *Attorney, Agent, or Firm* — Harness, Dickey & Pierce, P.L.C.

(57) ABSTRACT

A system to manage a buffering of a data stream for a peer client in a peer-to-peer based streaming service includes a buffering control unit including a processor configured to control pieces of the data stream to be buffered in a first buffer of the peer client, and to control one or more outputted pieces to be buffered in a second buffer of the peer client, the outputted pieces being outputted from the first buffer for play back of the data stream. A method for managing a buffering includes storing pieces of the data stream in a first buffer; storing one or more outputted pieces of the data stream in a second buffer; and transmitting one or more pieces stored in the first buffer or the second buffer.

20 Claims, 18 Drawing Sheets

(51) Int. Cl.
*H04N 21/845* (2011.01)
*H04L 29/06* (2006.01)
*H04N 21/6377* (2011.01)

(58) Field of Classification Search
USPC ........................................................ 709/231
See application file for complete search history.

(56) References Cited

U.S. PATENT DOCUMENTS

| | | | | |
|---|---|---|---|---|
| 8,150,675 | B1* | 4/2012 | Ortmanns | H04W 4/003 |
| | | | | 703/23 |
| 8,316,146 | B2* | 11/2012 | Ehn et al. | 709/231 |
| 8,443,086 | B2 | 5/2013 | Hsu et al. | |
| 8,806,050 | B2 | 8/2014 | Chen et al. | |
| 8,918,533 | B2 | 12/2014 | Chen et al. | |
| 9,094,263 | B2 | 7/2015 | Cohen | |
| 9,185,439 | B2 | 11/2015 | Chen et al. | |
| 9,237,101 | B2 | 1/2016 | Chen et al. | |
| 9,246,633 | B2 | 1/2016 | Luby | |
| 9,270,299 | B2 | 2/2016 | Luby et al. | |
| 9,288,010 | B2 | 3/2016 | Luby | |
| 2003/0002637 | A1* | 1/2003 | Miyauchi | H04M 3/10 |
| | | | | 379/93.01 |
| 2005/0097445 | A1 | 5/2005 | Day et al. | |
| 2005/0226272 | A1* | 10/2005 | Luby | H03M 13/6547 |
| | | | | 370/473 |
| 2008/0098123 | A1* | 4/2008 | Huang | H04L 67/1091 |
| | | | | 709/231 |
| 2008/0134258 | A1* | 6/2008 | Goose et al. | 725/91 |
| 2008/0140853 | A1* | 6/2008 | Harrison | 709/231 |
| 2008/0162670 | A1* | 7/2008 | Chapweske | G06F 8/65 |
| | | | | 709/219 |
| 2008/0201424 | A1* | 8/2008 | Darcie | 709/204 |
| 2008/0263057 | A1* | 10/2008 | Thompson | 707/10 |
| 2009/0113253 | A1 | 4/2009 | Wang et al. | |
| 2009/0303897 | A1* | 12/2009 | Kouretas et al. | 370/252 |
| 2010/0083268 | A1* | 4/2010 | Morris | 718/104 |
| 2010/0122026 | A1* | 5/2010 | Umamageswaran | G06F 12/084 |
| | | | | 711/113 |
| 2010/0146138 | A1* | 6/2010 | Ng | H04L 65/80 |
| | | | | 709/231 |
| 2010/0153578 | A1 | 6/2010 | Van Gassel et al. | |
| 2011/0072450 | A1 | 3/2011 | Kokernak et al. | |
| 2011/0106965 | A1* | 5/2011 | Chun et al. | 709/231 |
| 2011/0225312 | A1* | 9/2011 | Liu | H04L 12/18 |
| | | | | 709/231 |
| 2012/0137017 | A1 | 5/2012 | Kim et al. | |
| 2012/0297405 | A1* | 11/2012 | Zhang | H04H 20/08 |
| | | | | 725/9 |

FOREIGN PATENT DOCUMENTS

| | | |
|---|---|---|
| JP | 2004-343417 | 12/2004 |
| JP | 2010141567 A | 6/2010 |
| KR | 100496172 B1 | 6/2005 |
| KR | 1020060017695 | 2/2006 |
| KR | 10-2007-0102896 | 10/2007 |
| KR | 10-2007-0103801 | 10/2007 |
| KR | 10-2008-0022857 | 3/2008 |
| WO | WO-2009/076251 A2 | 6/2009 |

OTHER PUBLICATIONS

NPL3: Title-The Design of Video Segmentation-aided VCR Support for P2P VoD Systems; by Wang et al.*
Ketmaneechairat-NPL: Title: Smart Buffer Management for Different Start Video Broadcasting (ICIS 2009, Nov. 24-26, 2009 Seoul, Korea); by Ketmaneechairat et al.*
NPLSandvik: (title: The Distance-Availability Weighted Piece Selection Method for BitTorrent; by Sandvik et al; 2009).*
Ketmaneechairat et al. "Smart Buffer Management for Different Start Video Broadcasting," Dec. 2010, Advances in Information Sciences and Service Sciences, vol. 2, No. 4, Dec. 2010.*
Japanese Office Action dated Jul. 1, 2014 in corresponding Japanese Application No. 2012-008396.
Korean Office Action dated Apr. 9, 2014 in corresponding Application No. 10-2011-0005342.
Office Action dated Dec. 24, 2014 in related U.S. Appl. No. 13/353,491.
Korean Office Action dated Apr. 5. 2016 for Application No. KR 10-2012-0138689.
Japanese Office Action issued on May 31, 2016 by the Japanese Patent Office for corresponding JP Patent Application No. 2012-008396.
Non-Final Office Action for corresponding U.S. Appl. No. 13/353,491 dated Oct. 23, 2015.
Chris Dana et al., "BASS BitTorrent Assisted Streaming System for Video-on-Demand", IEEE Xplore Digital Library, IEEE-SA, IEEE Spectrum, 2005.
Notice of Allowance dated Apr. 27, 2016 in co-pending U.S. Appl. No. 13/353,491.
Korean Office Action issued on Oct. 20, 2016 by the Korean Patent Office for corresponding Korean Patent Application No. 10-2016-0102743.
Korean Office Action issued on Dec. 26, 2016 by the Korean Patent Office for corresponding Korean Patent Application No. 10-2012-0107895.
U.S. Appl. No. 13/353,491, filed Jan. 19, 2012.

* cited by examiner

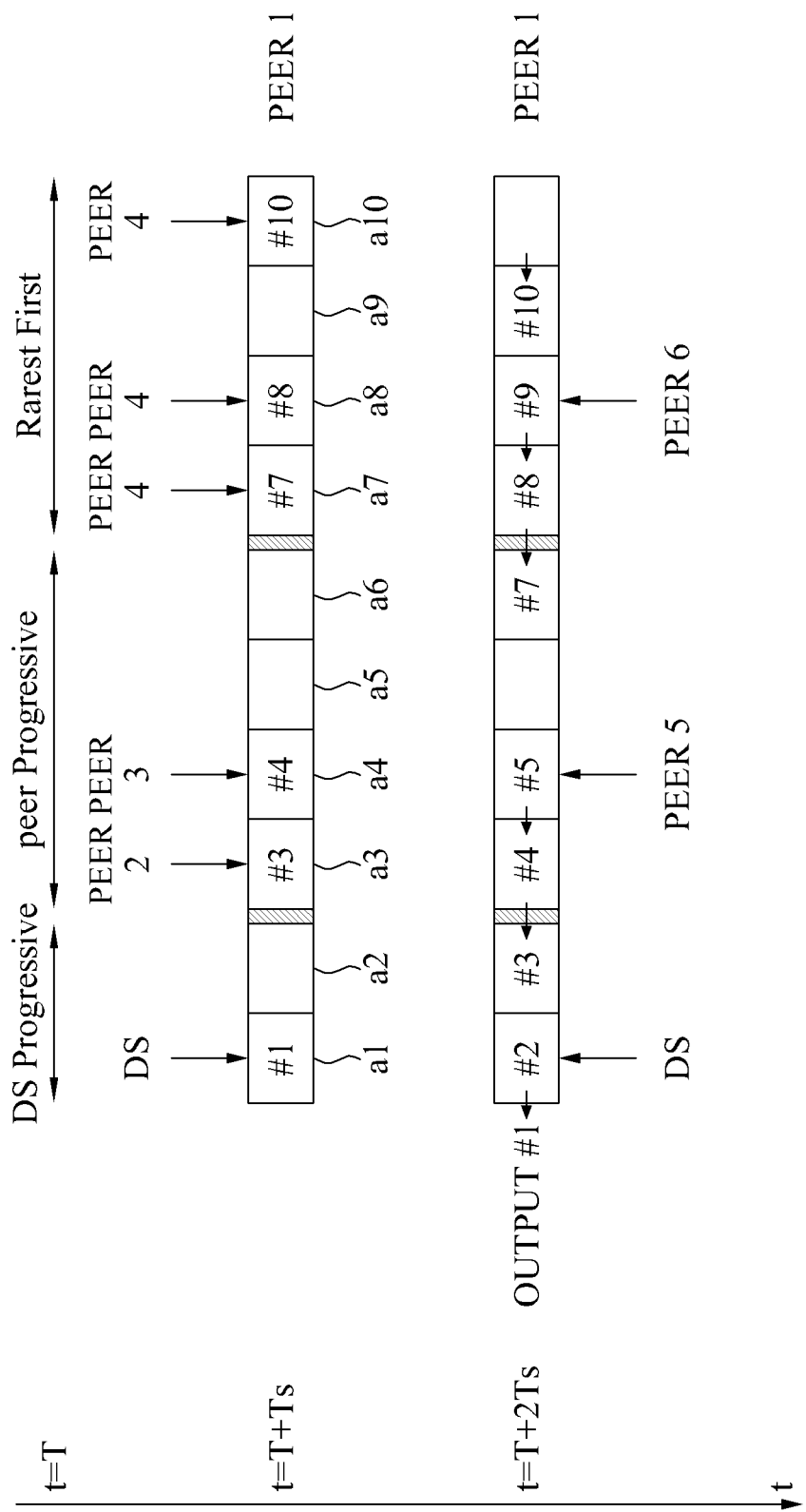

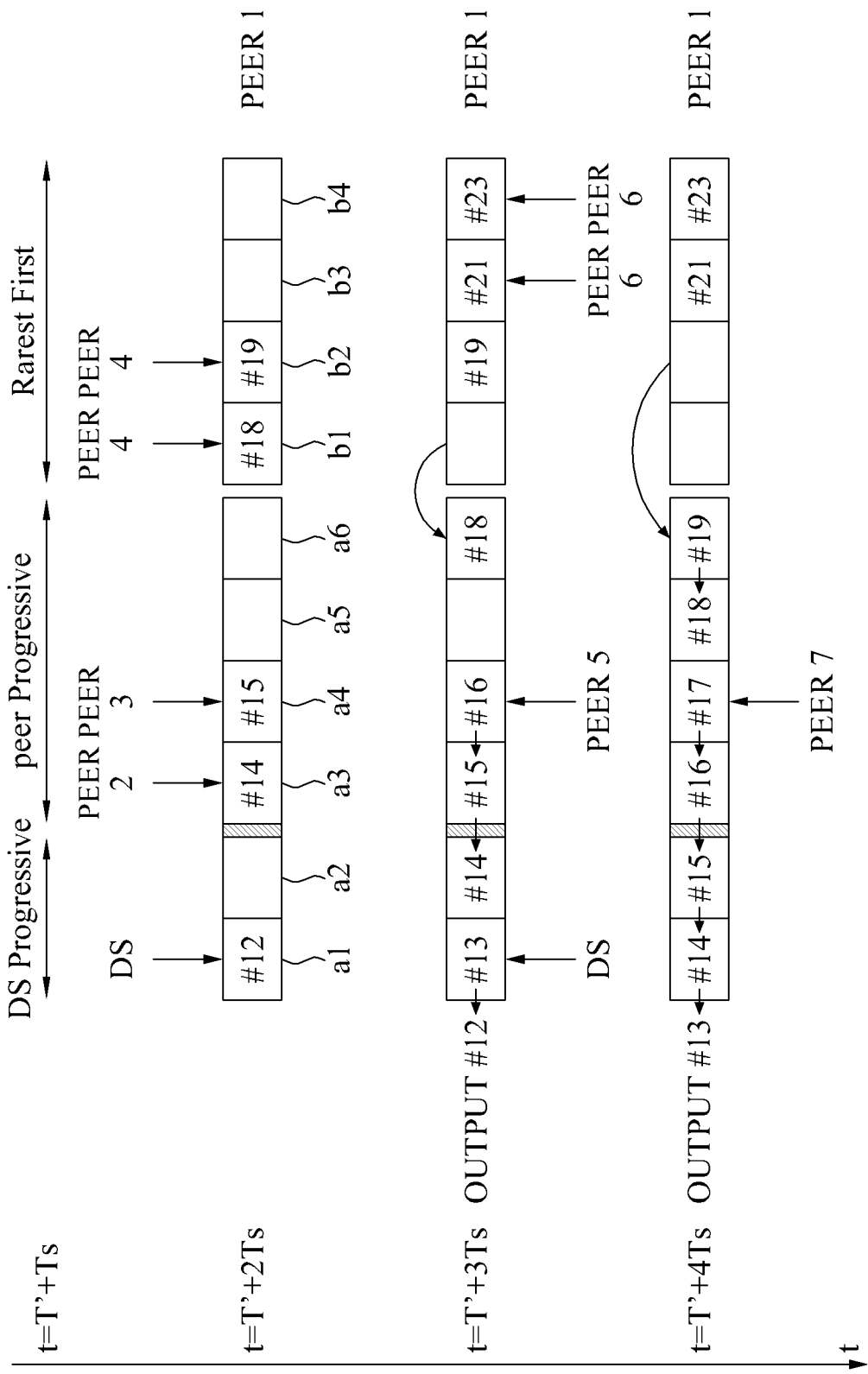

SYSTEM AND METHOD FOR MANAGING BUFFERING IN PEER-TO-PEER (P2P) BASED STREAMING SERVICE AND SYSTEM FOR DISTRIBUTING APPLICATION FOR PROCESSING BUFFERING IN CLIENT

CROSS-REFERENCE TO RELATED APPLICATION

This application claims priority from and the benefit of Korean Patent Application No. 10-2011-0005342, filed on Jan. 19, 2011, and Korean Patent Application No. 10-2011-0005923, filed on Jan. 20, 2011, all of which are hereby incorporated by reference for all purposes as if fully set forth herein.

BACKGROUND OF THE INVENTION

Field of the Invention

Exemplary embodiments of the present invention relate to a system and method for managing buffering in a peer-to-peer (P2P) based streaming service.

Discussion of the Background

A peer-to-peer (P2P) service refers to a service in which data or information is received directly from peer terminals such as personal computers that are connected to a network such as the Internet. The P2P service may be different from a conventional scheme of searching for information on the Internet using a search engine.

Further, 'streaming' refers to a technology for playback of a file by receiving the file in real time through a network. For example, progressive streaming is one type of streaming technologies.

When the streaming technology is applied to a P2P technology, server load or service load may be reduced, such that cost reduction for the server operation may be realized. In order to achieve the foregoing, a client using a P2P-based streaming service may incorporate a function for the P2P-based streaming service into a content player to play back a content, such as a multimedia file, and may communicate with a server providing the P2P-based streaming service, thereby embodying the P2P-based streaming service. More particularly, a server may provide a list of contents available on a web page, and the client may select a desired content in the list by clicking the desired content. When the content is selected, the content player installed in the client is executed to play back the selected content. The content player plays back the selected content by receiving the content from the server and other peers using the P2P-based streaming technology. The client and other peers may also be referred to as a peer client.

If a user of the client accesses a server to use the P2P-based streaming service, and selects a content, a peer having the selected content is identified and connected to the client in order to provide the content to the client. That is, the content player of the client plays back file pieces of the selected content by receiving the file pieces of the content from the server or other is connected peers having the content.

In a P2P-based streaming service, it may be difficult to maintain synchronization between peers and synchronization between a peer and a server because of a varying network condition. If the synchronization between the peers and/or the synchronization between the peer and the server fail, a sharing ratio of data packets may decrease.

To address aforementioned problems, a system and method for managing buffering in a P2P-based streaming service will be provided.

SUMMARY OF THE INVENTION

Exemplary embodiments of the present invention provide a system and method for managing buffering that may prevent a decrease in a sharing ratio of data pieces between peers. It may be performed by buffering one or more used pieces for playback of a content.

Exemplary embodiments of the present invention also provide a system and method for dynamically adjusting the size of a buffer to store pieces of a data stream based on a network condition.

Exemplary embodiments of the present invention also provide a system and method for maintaining the size of a buffer to be constant if the sizes of regions of the buffer are adjusted.

Additional features of the invention will be set forth in the description which follows, and in part will be apparent from the description, or may be learned by practice of the invention.

An exemplary embodiment of the present invention provides system to manage a buffering of a data stream for a peer client in a peer-to-peer based streaming service, including a is buffering control unit including a processor configured to control pieces of the data stream to be buffered in a first buffer of the peer client, and to control one or more outputted pieces to be buffered in a second buffer of the peer client, the outputted pieces being outputted from the first buffer for play back of the data stream.

An exemplary embodiment of the present invention provides a method for managing a buffering of a data stream in a peer-to-peer based streaming service, including storing pieces of the data stream in a first buffer of a peer client; storing one or more outputted pieces of the data stream in a second buffer of the peer client, the outputted pieces being outputted from the first buffer for play back of the data stream; and transmitting one or more pieces stored in the first buffer or one or more pieces stored in the second buffer to another peer client.

An exemplary embodiment of the present invention provides a non-transitory computer-readable medium including a program for instructing a computer, when executed by a processor, to perform the steps of: storing pieces of the data stream in a first buffer of a peer client; storing one or more outputted pieces of the data stream in a second buffer of the peer client, the outputted pieces being outputted from the first buffer for play back of the data stream; and transmitting one or more pieces stored in the first buffer or one or more pieces stored in the second buffer to another peer client.

An exemplary embodiment of the present invention provides a terminal to manage a buffering of a data stream in a peer-to-peer based streaming service, including a first buffer configured to store pieces of the data stream, and to output the stored pieces for play back of the data stream; a second buffer configured to store one or more pieces outputted from the first buffer; and a communication unit configured to transmit one or more pieces stored in the is first buffer or the second buffer to another peer client.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor

FIG. 12A is a diagram illustrating a buffer structure of a peer client according to an exemplary embodiment of the present invention.

FIG. 13 is a diagram illustrating a buffer structure of a peer client according to an exemplary embodiment of the present invention.

DETAILED DESCRIPTION OF THE ILLUSTRATED EMBODIMENTS

Figure 1:
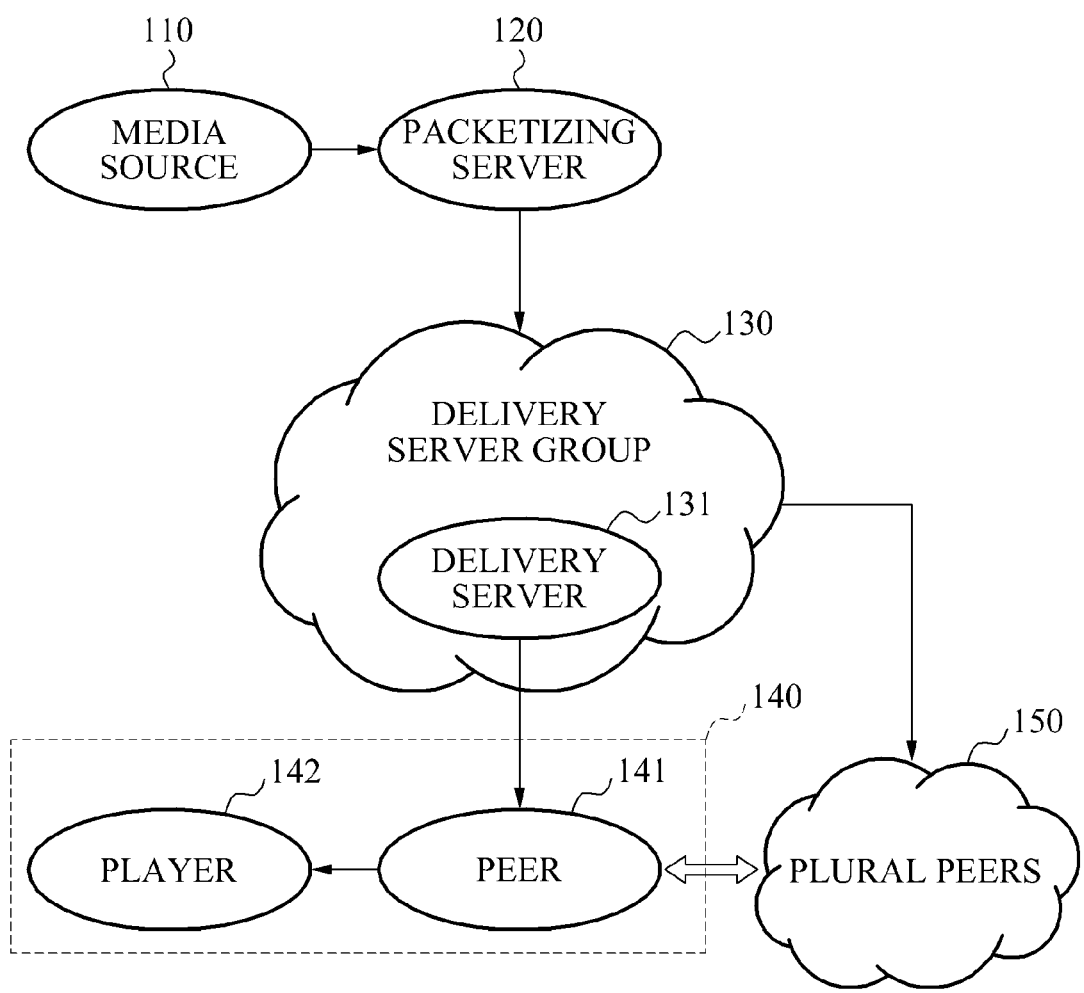
- FIG. 1 is a diagram illustrating a schematic configuration of a system to provide a peer-to-peer (P2P) based streaming service according to an exemplary embodiment of the present invention.

Exemplary embodiments now will be described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). It will be understood that when an element is referred to as being "connected to" another element, it can be directly connected to the other element, or intervening elements may be present.

FIG. 1 is a diagram illustrating a schematic configuration of a system to provide a peer-to-peer (P2P) based streaming service according to an exemplary embodiment of the present invention. As shown in FIG. 1, the system includes a media source 110, a packetizing server 120, a delivery server group 130, a client 140, and a plurality of peers 150.

The media source 110 may include an encoder to provide a data stream. The packetizing server 120 may receive the data stream from the media source 110, and may index at least one piece of the received data stream. One of various schemes that are already known may be used as a method of indexing at least one piece of a data stream in order to provide the data stream through a P2P service. The packetizing server 120 may include one or more packetizing servers corresponding to each media source 110. For example, it may be assumed that four professional baseball games are broadcasted in real time. When four media sources 110 are provided for the four games, four packetizing servers 120 may be used for the four media sources 110, respectively. Each media source 110 and/or services therefrom may be referred to as a channel. Further, corresponding streaming services and corresponding servers for each of is the multiple media sources 110 may be distinguished by channel information. If one or more packetizing servers 120 correspond to each of media sources 110, a corresponding packetizing server 120 for each media source 110 may also be referred to as a channel. The packetizing server 120 will be further described later with reference to FIG. 3.

The delivery server group 130 may include at least one delivery server 131. The number of delivery servers 131 operated in the delivery server group 130 may be controlled based on the number of online visitors concurrently connected to the delivery server group 130. The delivery servers 131 operated in the delivery server group 130 may be referred to as active delivery servers. The number of online visitors may be the number of peer clients concurrently connected to the delivery server group 130. Further, the number of online visitors may be the number of peer clients concurrently connected to the delivery server group 130 for a specific content if multiple contents are delivered by the delivery server group 130. The delivery server 131 may receive, from the packetizing server 120, the indexed at least one piece of the data stream and may buffer the at least one piece of the data stream. The delivery server 131 may transmit the at least one piece of the data stream to the client 140 in accordance with a request from the client 140.

The client 140 may refer to a user terminal, for example, a personal computer (PC), a mobile terminal, and the like, and may also include a peer 141 and a player 142 as illustrated in FIG. 1. The peer 141 may receive the at least one piece of the data stream from at least one of the delivery server 131 and the plurality of peers 150, and may transmit the data stream to the player 142. For example, the peer 141 may correspond to a program installed and executable in the client 140. Each of the plurality of peers 150 may also be installed and executable in a plurality of clients, respectively.

The data stream converted into the at least one piece at the packetizing server 120 may be transmitted to at least some of all connected clients through the delivery server group 130. From a point of view of the single client 140, the at least one piece of the data stream may be received from the delivery server 131 and/or other clients, and the data stream may be transmitted to the player 142, whereby the user may receive the P2P-based streaming service.

The server usage controlling system according to an embodiment of the present invention may refer to the system described with reference to FIG. 1, or may be included in or connected to the system described with reference to FIG. 1. The server usage controlling system may adaptively control the server usage based on the number of online visitors, thereby constantly maintaining low server traffic regardless of the number of online visitors. The server usage may be controlled based on a ratio of a variable to the number of online visitors concurrently connected to a server, and the variable may be determined based on an influx rate of online visitors. For example, the server usage may be computed as expressed by Equation 1.

$$\text{Server Usage} = c/n,$$ [Equation 1]

where 'c' denotes a variable determined based on an influx rate of online visitors, and 'n' denotes the number of online visitors concurrently connected to a server. The number of online visitors concurrently connected to a server may be referred to as the number of online visitors occupying a server, or concurrent connections number. Further, 'c' may correspond to a variable determined by an administrator or a system through an empirical test. 'c' may be determined to be a relatively larger value when the influx rate of the online visitors is higher, and may be determined to be a relatively smaller value when the influx rate is lower. Equation 1 may indicate that traffic for 'c' users may be used to cover 'n' users. For example, when 'c' corresponds to six, traffic for six users may be used to cover all 'n' users, that is, all online visitors occupying the server. Further, 'n' and 'c' may be separately calculated for each channel.

The variable 'c' may be set as a constant in consideration of influx rate of online visitors. The variable 'c' may be preset based on a prediction obtained from previous data of the influx rate of online visitors and/or the number of online visitors occupying a server, and may be determined through an empirical test. Further, as 'n' increases, the server usage of each online visitor may decrease because the server usage of each online visitor is inversely proportional to 'n'. However, total server usages for a channel may be substantially constant because the number of online visitors connected to the channel increases to 'n'.

Further, the variable 'c' may be expressed by the following equation; $c=k*f(i)$, where $f(i)$ may be a function of T that increases as T increases. The $f(i)$ may be a monotonically increasing function. For example, $c=k*i$. That is, the variable 'c' may be proportional to the influx rate of online visitors 'i'. Further, coefficient 'k' may be determined through the empirical test. Thus, the variable 'c' may be dynamically controlled according to the change of the influx rate of online visitors 'i'.

Although the number of online visitors occupying the server increases due to an increase in the influx rate of the online visitors, the server usage may gradually decrease since the variable 'c' may be fixed or properly controlled, whereas 'n' may increase. Accordingly, low server usage may be constantly maintained regardless of the number of the online visitors.

In order to achieve the foregoing, the server usage controlling system may include a concurrent connections number providing unit (now shown) to provide the number of online visitors concurrently connected to a server, and a server usage controlling unit (not shown) to control the server usage based on a ratio of a variable to the number of online visitors concurrently connected to the server. As noted above, the variable may be determined based on an influx rate of online visitors.

Figure 2:
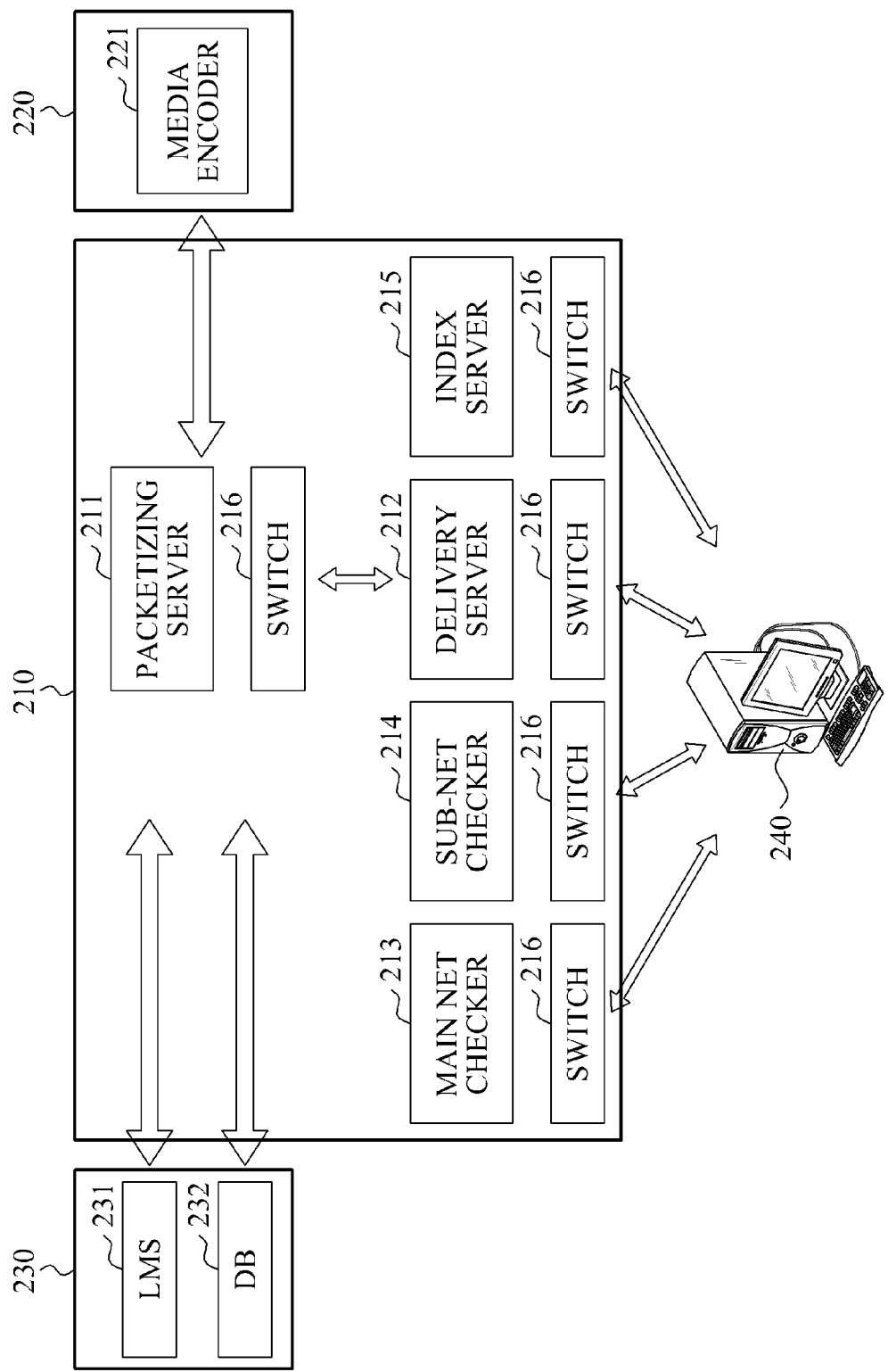
FIG. 2 is a diagram illustrating a physical configuration of a system to provide a P2P-based streaming service according to an exemplary embodiment of the present invention.

FIG. 2 is a diagram illustrating a physical configuration of a system to provide a P2P-based streaming service according to an exemplary embodiment of the present invention. FIG. 2 illustrates an external Internet data center (IDC) 210 to provide equipment for a P2P-based streaming service, an encoder apparatus 220 to provide a data stream, and an internal IDC 230 to manage a process for providing the data stream to a client 240 by the external IDC 210.

The external IDC 210 may include a packetizing server 211, a main net checker 213, a sub-net checker 214, a delivery server 212, an index server 215, and a plurality of switches 216. Each of the packetizing server 211, the delivery server 212, the main net checker 213, the sub-net checker 214, and the index server 215 may include a plurality of servers, rather than a single server. Each of the plurality of switches 216 may be used to transmit data to a corresponding server or to receive data from the corresponding server, among the plurality of servers. For example, an L4 switch may be used as each of the plurality of switches 216.

The packetizing server 211 may receive the data stream from a media encoder 221 of the encoder apparatus 220 and may process the received data stream to pieces of data to be used in the server usage controlling system. That is, the packetizing server 211 may convert the data stream into a plurality of pieces. As aforementioned, each packetizing server 211 may be operated in a corresponding media encoder 221.

Figure 3:
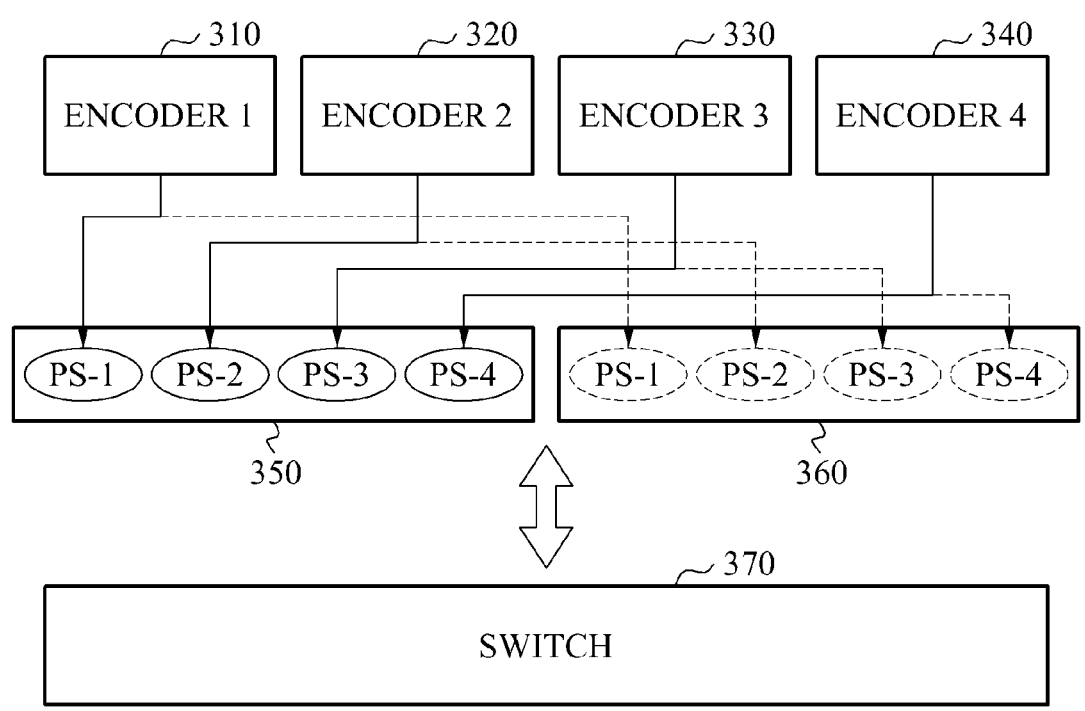
FIG. 3 is a diagram illustrating a dualization of a packetizing server according to an exemplary embodiment of the present invention.

The delivery server 212 may transfer, to the client 240, the at least one piece of the data stream received from the packetizing server 211, in accordance with a request from the client 240. Also, the index server 215 may maintain a list of clients and may provide a search service. Through the search service, a connected peer client having one or more desired pieces is of the data stream may be searched for. The search service may be performed for each channel. The list of clients may also be searched for by each connected client. Further, the list of clients may be distinguished by multiple sub-lists of connected clients per content item (e.g., per channel or per media source). Referring to FIG. 3, for example, the four encoders 310, 320, 330, and 340 may provide a first content, a second content, a third content, and a fourth content, respectively. The list of clients may include a first sub-list of connected clients for the first content, a second sub-list of connected clients for the second content, a third sub-list of connected clients for the third content, and a fourth sub-list of connected clients for the fourth content. The influx rate of online visitors and the number of online visitors concurrently connected to the P2P based streaming server may be separately calculated for each content item. Further, the influx rate of online visitors and the number of online visitors concurrently connected to the P2P based streaming server may be calculated for a portion of or all the content items provided by the P2P streaming server. Further, a connected client may search for other connected peers, data stored in a buffer of other connected clients including at least one piece of a streaming data using the search service provided by the index server 215. The main net checker 213 and the sub-net checker 214 may refer to relay servers to relay connections between peers.

Table 1 shows an example of the number of servers used when the number of online visitors corresponds to 150,000, a content bit rate corresponds to 500 kilobytes per second (kbps), and a sharing ratio corresponds to 80%. The sharing ratio may be sharing ratio of a piece of the streaming data among peer clients. Further, the sharing ratio may be calculated for each channel. The sharing ratio may be determined based on server usage in a channel and total number of pieces received by peers connected to the channel. The sharing ratio may be is monitored and be used to determine the variable 'c'

TABLE 1

| Server | Performance | Number of Servers Used |
| --- | --- | --- |
| Index Server | Support 10,000 per an Index Server | 15 + 1 |
| Delivery Server | Support 800 Mbps per a Delivery Server | 18 + 1 |
| Packetizing Server | No Performance Issue | 2 (primary/secondary) |

A Live cast Management system (LMS) 231 included in the internal IDC 230 may refer to a peer management system. The LMS 231 may correspond to a server to manage the packetizing server 211, the delivery server 212, and the index server 215. The LMS 231 may monitor an upload and download state of a server, traffic, the number of queries, a resource, for example, a central processing unit (CPU) and a memory, a sharing ratio, and the like. Also, the LMS 231 may generate statistical data about the number of online visitors, the number of unique visitors, a sharing rate, a user rate distribution, an average amount of viewing time, the number of channels viewed, and the like, and may store the generated statistical data in a database (DB) 232. That is, the DB 232 may refer to a server to store the statistical data. The user rate distribution may include information on the data transmission rate of each connected peer client. The average amount of viewing time may include average amount of viewing time for each media source. The number of channels viewed may include the number of media source requested by peer clients. The server usage may be stored in the index server 215, and each online visitor connected to a delivery server may use the delivery server according to the server usage stored in the index server.

The server usage controlling system may adaptively control the server usage is based on the number of online visitors in real time, thereby constantly maintaining low server traffic regardless of the number of online visitors. The server usage may be controlled based on a ratio of a variable to the number of online visitors concurrently connected to a server, and the variable may be determined based on an influx rate of the online visitors. For example, the server usage may be computed as expressed by Equation 1, and the computed server usage may indicate traffic of the delivery server 212 described with reference to FIG. 2. Also, the server usage controlling system described with reference to FIG. 1 may refer to the system described with reference to FIG. 2, or may be included in the LMS 231 or the index server 215. Further, traffic usage of the delivery server 212 may be controlled by the server usage controlling system according to the influx rate of online visitors and the number of online visitors concurrently connected to a delivery server. The influx rate of online visitors and the number of online visitors concurrently connected to a delivery server may be separately calculated and applied for each channel. Further, server usage control may also be applied independently for each channel.

FIG. 3 is a diagram illustrating a dualization of a packetizing server according to an exemplary embodiment of the present invention. FIG. 3 may indicate that four packetizing servers may be operated in a main packetizing server group 350 if a data stream is provided through four encoders 310, 320, 330, and 340. That is, a PS-1, a PS-2, a PS-3, and a PS-4 may indicate the four packetizing servers.

The four packetizing servers PS-1, PS-2, PS-3, and PS-4 may convert data streams that are received from each of the four encoders 310, 320, 330, and 340, respectively into at least one data piece that may be used in P2P, and may transmit the converted data to active delivery servers. The four packetizing servers and the delivery servers may transmit and receive the data using a switch 370.

The packetizing servers may use a smaller portion of a resource, for example, a CPU, traffic, and the like. For example, when twenty delivery servers are accessed and the number of online visitors concurrently connected to a server corresponds to 150,000, less than or equal to 20 Megabits per second (Mbps)-traffic may be used for a 1-Mbps content.

Since different data streams may be transmitted from the four encoders 310, 320, 330, and 340 to each packetizing server PS-1, PS-2, PS-3, and PS-4, a piece of a data stream may be generated in either the main packetizing server group 350 or a sub-packetizing server group 360, as illustrated in FIG. 3. Accordingly, the main packetizing server group 350 and the sub-packetizing server group 360 may be operated in an active/standby form. The sub-packetizing server group 360 may be used in replacement of the main packetizing server group 350.

Figure 4:
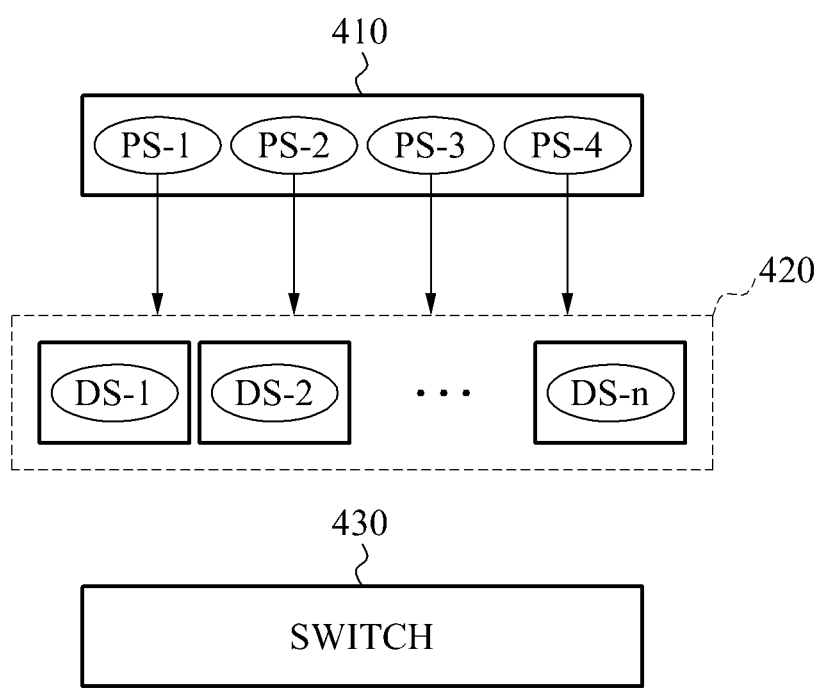
FIG. 4 is a diagram illustrating a dualization of a delivery server according to an exemplary embodiment of the present invention.

FIG. 4 is a diagram illustrating a dualization of a delivery server according to an exemplary embodiment of the present invention. Pieces corresponding to data converted by a packetizing server group 410 may be transmitted to a delivery server group 420. The 'DS-n' may refer to an 'nth' delivery server, and may indicate that 'n' delivery servers may be included in the delivery server group 420. Activated number of delivery servers may be determined based on the number of online visitors.

Each of the delivery servers may receive at least one piece of a data stream from a packetizing server, may perform buffering on a certain number of pieces, and may transmit the corresponding pieces to peers in accordance with requests from the peers corresponding to clients. Further, delivery servers included in the delivery server group 420 may be bound to a switch 430 as well, and traffic may be controlled by increasing the number of active delivery servers in accordance with an increase in the number of online visitors.

Figure 5:
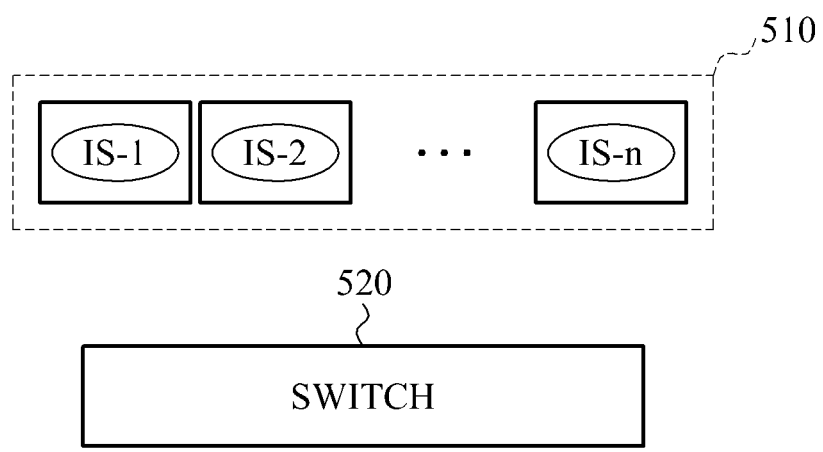
FIG. 5 is a diagram illustrating a dualization of an index server according to an exemplary embodiment of the present invention.

FIG. 5 is a diagram illustrating a dualization of an index server according to an is exemplary embodiment of the present invention. An index server group 510 may include a plurality of index servers. The 'IS-n' may refer to an 'nth' index server, and may indicate that 'n' index servers may be included in the index server group 520.

Each of the plurality of index servers may manage peers corresponding to clients. More particularly, each of the plurality of index servers may manage peers installed in the clients, and may transfer a search result in response to requests from the peers. Also, the index servers may perform a message transfer, and may maintain a continuous connection with the peers. Each of the index servers may be bound to a switch 520, and the number of index servers may be increased based on the number of online visitors.

Figure 6:
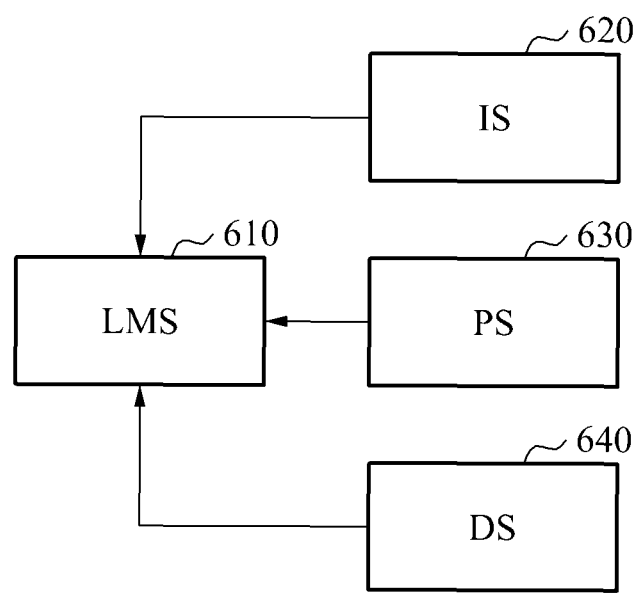
FIG. 6 is a diagram illustrating a peer management system according to an exemplary embodiment of the present invention.

FIG. 6 is a diagram illustrating a peer management system according to an exemplary embodiment of the present invention. In FIG. 6, an LMS 610 may refer to a peer management system, and an IS 620 may refer to an index server, a PS 630 may refer to a packetizing server, and a DS 640 may refer to a delivery server. The peer management system may perform management, distribution, update, and monitoring functions on the index server 620, the packetizing server 630, and the delivery server 640, and may also perform statistical data collection and analysis functions on a peer. For example, the peer management system may monitor states of the index server 620, the packetizing server 630, and the delivery server 640, for example, CPU usage, memory usage or traffic, and may provide an event alert function in response to an error or a predetermined situation through a short message service (SMS), or an e-mail.

Figure 7:
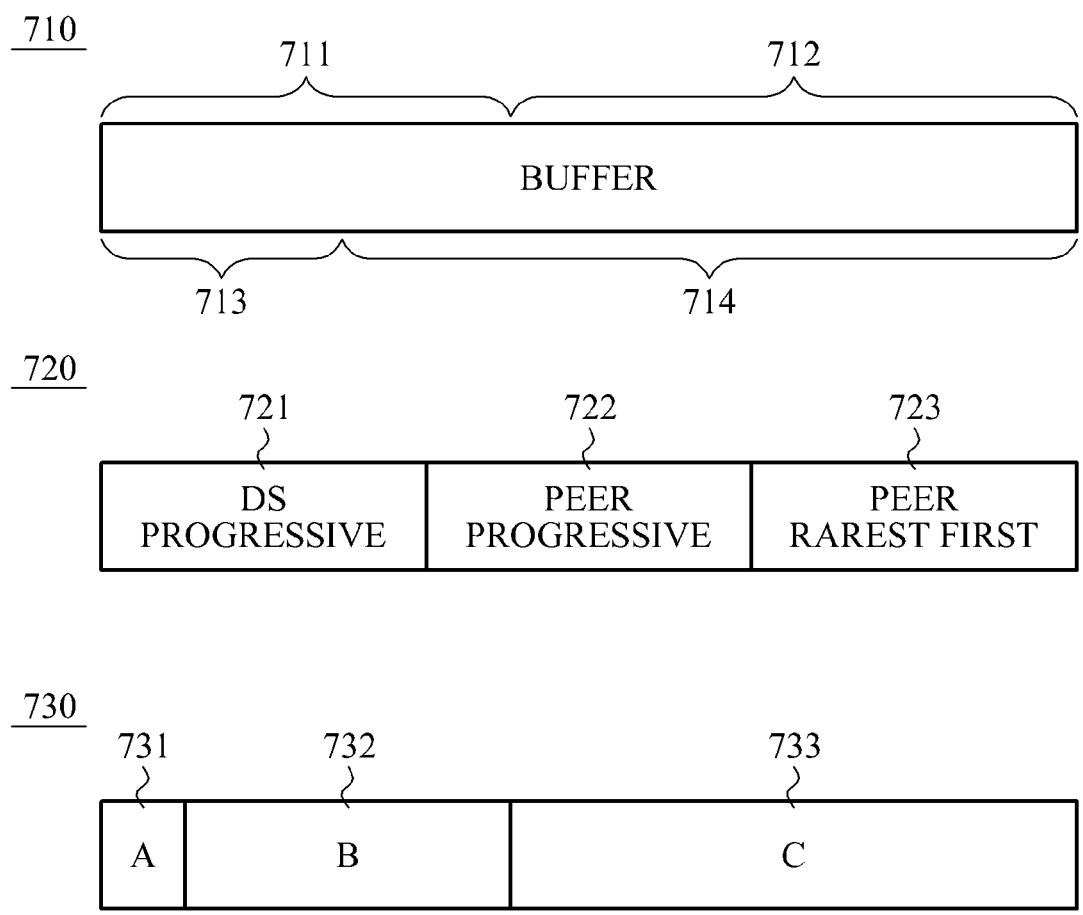
FIG. 7 is a diagram illustrating a buffer structure in a peer according to an exemplary embodiment of the present invention.

FIG. 7 is a diagram illustrating a buffer structure in a peer according to an exemplary embodiment of the present invention. A peer may correspond to software that may be installed and executed in a client, and the peer may determine which piece is to be received, and is from where the corresponding piece is to be received. Table 2 shows methods of selecting a piece in a peer, and available sources.

TABLE 2

| Piece Selecting Method | Available Source |
|---|---|
| Rarest First | Delivery Server |
| Progressive | Other Peers |

In Table 2, 'Rarest First' may refer to a piece selecting method in which a rarest piece on a network may be received first, and 'Progressive' may refer to a piece selecting method in which pieces may be received sequentially starting from the header. The piece may be received from the delivery server, or other peers.

The peer may use a buffer to store the received pieces, for a smooth playback and a high sharing efficiency.

FIG. 7 illustrates a first buffer 710, a second buffer 720, and a third buffer 730.

The first buffer 710 may be classified into a first region 711 to store the received pieces using 'Progressive,' and a second region 712 to store the received pieces using 'Rarest First.' Further, the first buffer 710 may be classified into a third region 713 to store the pieces received from the delivery server, and a fourth region 714 to store the pieces received from other peers. Pieces stored in the first region 711 or the second region 712 may be transmitted from other peers or the delivery server, and the pieces to be stored in the first region 711 or the second region 712 may be requested to other peers before requesting to the delivery server to reduce server usage of the delivery server. Further, the first region 711 or the second region 712 may be divided into a Delivery Server (DS) region (not shown) to store the pieces received from the delivery server and a peer region (not shown) to store the pieces received from other peers.

The second buffer 720 may indicate regions of a buffer, which may be actually classified. The second buffer 720 may be classified into a first region 721 to store the pieces received from the delivery server using 'Progressive (DS Progressive), a second region 722 to store the pieces received from the other peers using 'Progressive (peer Progressive), and a third region 723 to store the pieces received from other peers using 'Rarest First' (peer Rarest First).

The third buffer 730 may indicate that sizes of classified regions may be different. The third buffer 730 may include a region A 731, a region B 732, and a third region C 733, each having different size. For example, the sizes of the region A 731, the region B 732, and the region C 733 may be proportioned 1:4:16, respectively. The proportions may be adaptively changed based on various parameters, such as the network condition of the peer client, the number of online visitors, and server status. Also, a portion of the pieces may be received from the server, and may be stored in the region B 732 and the region C 733. The server may be a delivery server. The first buffer 710, the second buffer 720, and the third buffer 730 may be the same buffer having different exemplary structures of buffer spaces in different perspectives. Each peer client may control at least one of the sizes of the first region 711 of the first buffer 710, the second region 712 of the first buffer 710, the third region 713 of the first buffer 710, the fourth region 714 of the first buffer 710, the first region 721 of the second buffer 720, the second region 722 of the second buffer 720, the third region 723 of the second buffer 720, the region A 731, the region B 732, and the region C 733. The size of each region may be larger than or equal to zero. Positions of multiple regions in the first buffer 710, the second buffer 720, or the third buffer 730 may be interchangeable, for example, the first region 721 may be peer progressive region to store the pieces received from other peers using 'Progressive,' and the second region 722 may be DS progressive region to store the pieces received from the delivery server using 'Progressive.'

Further, the server usage controlling system may generate buffer control information. The buffer control information may be sent to each connected peer client to control buffer allocations. The buffer control information may include information on the size of a buffer space for pieces received from the delivery server and the size of a buffer space for pieces received from other peer clients. Further, the buffer control information may include information on a ratio between the buffer space for pieces received from the delivery server and the buffer space for pieces received from other peer clients. For example, each connected peer client may control the size of the third region 713, and the fourth region 714, based on the buffer control information. Further, each connected peer client may control the size of the third region C 733, based on the buffer control information.

Details of server usage controlling system and method thereof are also found in U.S. patent application Ser. No. 13/304,337 which is hereby incorporated by reference.

If peers are asynchronized, a sharing ratio of pieces among the peers may decrease. To increase the sharing ratio, each peer may use a buffer to buffer one or more used pieces for playback of a content. The buffer used to buffer one or more used pieces for playback of the content will be hereinafter referred to as a 'Z-buffer.' The Z-buffer may discard a stored used piece and store another used piece. Further, the Z-buffer may store rarer used pieces to increase a sharing ratio. For example, if Z-buffer of peer 1 (not shown) stores used piece 1, used piece 2, and used piece 3, and Z-buffer of peer 2 (not shown) stores used piece 2, used piece 3, and used piece 4, then Z-buffer of peer 3 (not shown) may store used piece 1, used piece 4, and used piece 5 among used pieces 1, 2, 3, 4, and 5 if the used pieces 1, 2, 3, 4, and 5 are available to be stored in the Z-buffer.

Figure 8:
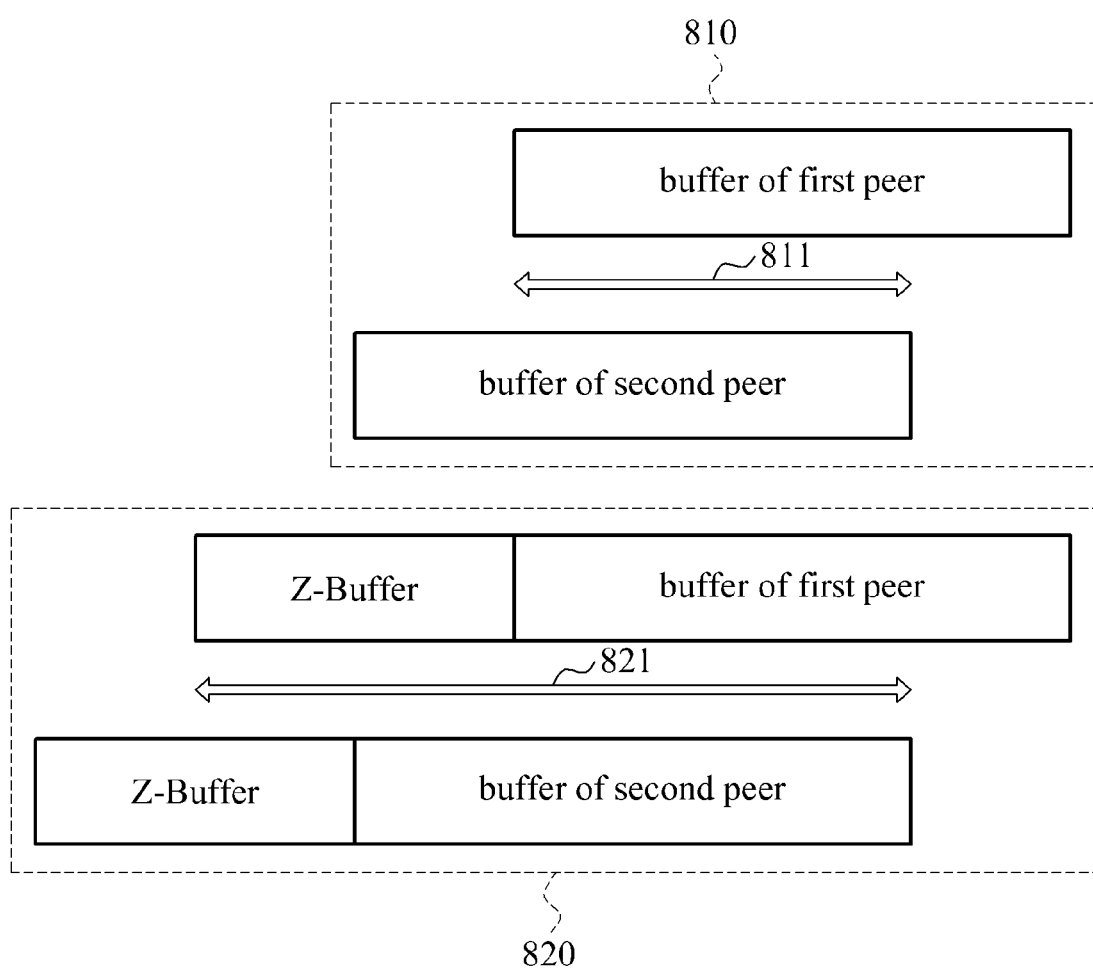
FIG. 8 is a diagram illustrating a buffer structure to buffer used pieces for playback of a content according to an exemplary embodiment of the present invention.

FIG. 8 is a diagram illustrating a buffer structure to buffer used pieces for playback of a content according to an exemplary embodiment of the present invention. A first dotted box 810 of FIG. 8 shows a buffer of a first peer and a buffer of a second peer. The size 811 of a buffer portion capable of sharing pieces may decrease if the first peer and the second peer are asynchronized in streaming the pieces stored in the buffers. Further, if the size 811 of the buffer capable of sharing pieces decreases, sharing ratio of data pieces may also decrease. A second dotted box 820 of FIG. 8 indicates that sharing ratio of data pieces may be increased by increasing the size 821 of a sharable buffer portion using a Z-buffer.

Buffering may enable a smooth playback of a content and increase a sharing ratio in a streaming service. However, since a bigger-sized buffer may cause a delay of buffering and a slowdown of a playback of the content, excessive usage of buffering using a bigger buffer size may cause a lower quality streaming service. On the other hand, if peers are asynchronized, a smaller-sized buffer may cause a decrease in sharing ratio. Accordingly, it may be possible to increase the sharing ratio among peers and to minimize the delay of buffering, by buffering one or more used pieces that are already used for playback using the Z-buffer.

In a P2P-based streaming service, it may be difficult to maintain synchronization between peers or synchronization between a peer and a streaming server because of different network conditions among nodes and thus, the sharing ratio of pieces may decrease. Further, peers using the Z-buffer may increase sharing ratio of pieces by dynamically adjusting the size of the buffer for storing unused pieces and/or the size of the Z-buffer for storing used pieces. The total buffer size of the entire buffer including the buffer for unused pieces and the Z-buffer may be maintained as a fixed value.

Figure 9:
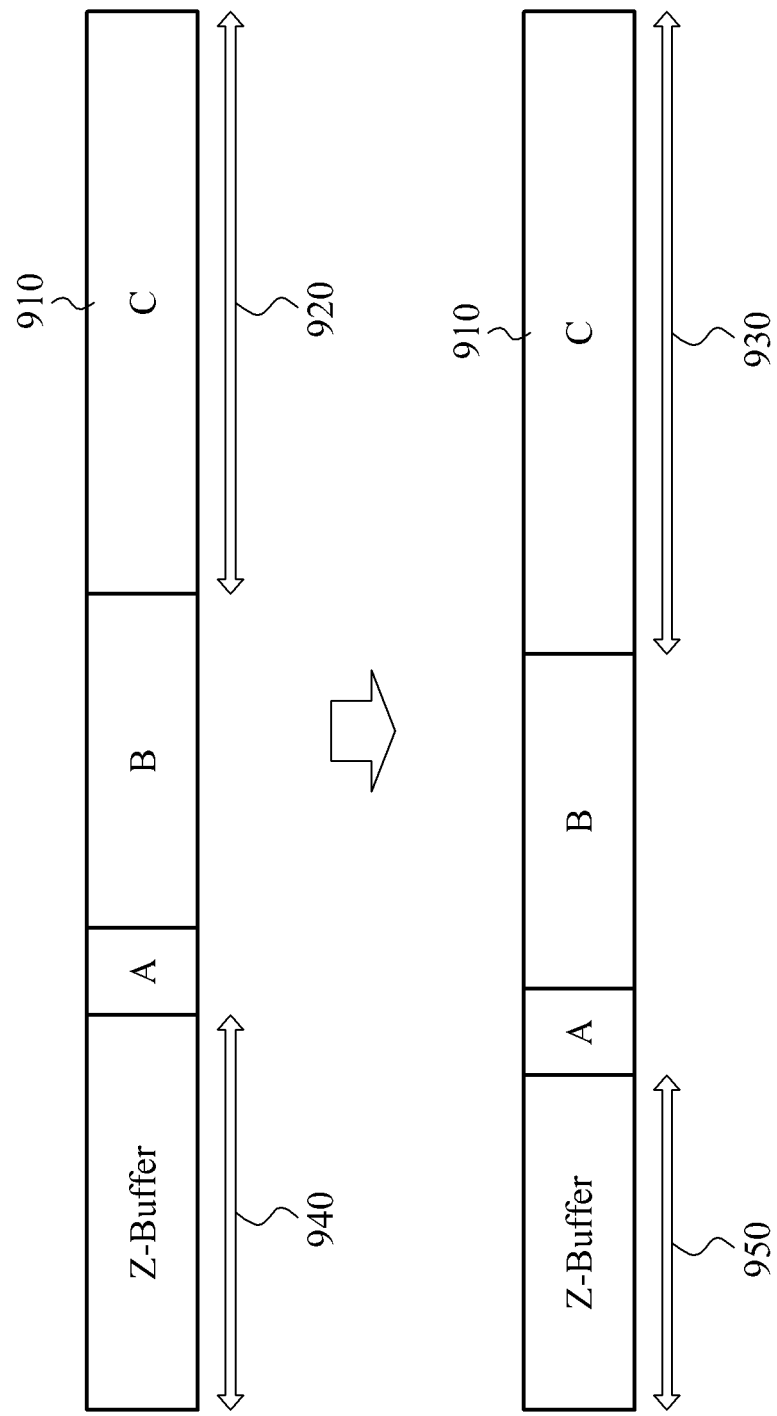
FIG. 9 is a diagram illustrating an adjustable buffer structure of a peer according to an exemplary embodiment of the present invention.

FIG. 9 is a diagram illustrating an adjustable buffer structure of a peer according to an exemplary embodiment of the present invention. As shown in FIG. 9, a region C 910 may correspond to a buffer space used to store pieces of a data stream received from other peers using the Rarest First scheme. The buffer size of the region C 910 may be increased from a first size 920 to a second size 930, and the buffer size of a Z-buffer may be reduced from a third size 940 to a fourth size 950. Thus, the size of the entire buffer (Z-buffer, A, B, and C region) may be maintained to be constant.

Further, the entire buffer sizes of connected peers in the same channel may be increased or decreased in response to a message. The message may be sent from the index server, the delivery server or a connected peer of the channel. For example, if a sharing ratio in the channel for a streaming service decreases, the index server, the delivery server or a peer in the channel may transmit messages to connected peers to increase total buffer sizes to a certain target value.

The network condition for each peer may be determined based on one or more network condition parameters, for example, at least one of a download speed to a peer and an upload speed from the peer. The size of a buffer may be determined based on the network condition.

FIG. 9 shows an exemplary embodiment for adjusting the size of the region C 910 and the size of the Z-buffer; however it is not limited as such. The size of a region A or the size of a region B may be adjusted, and sizes of at least two regions among the three regions may be adjusted.

Figure 10:
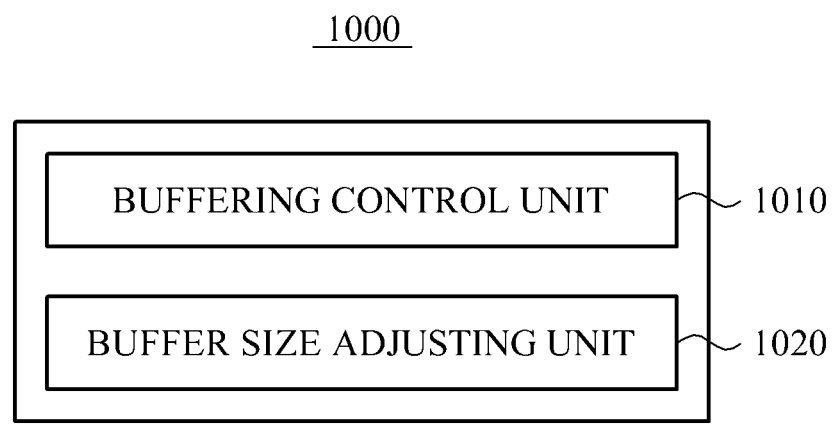
FIG. 10 is a block diagram illustrating a system to manage an adjustable buffer according to an exemplary embodiment of the present invention.

FIG. 10 is a block diagram illustrating a system to manage an adjustable buffer according to an exemplary embodiment of the present invention. The system 1000 may be included and operated in a terminal using buffering, such as a peer, that is, a client terminal for a P2P-based streaming service. The system 1000 may include a buffering control unit 1010 and a buffer size adjusting unit 1020.

The buffering control unit 1010 may store pieces of a data stream received from a delivery server or at least one other peer in a first buffer ("a buffer for storing unused pieces"), and may store, in a second buffer ("Z-buffer for storing used pieces"), at least some of pieces of the data stream used for playback of a content among the pieces of the data stream stored in the first buffer. The first buffer described with respect to FIG. 10 and FIG. 11 may correspond to the first buffer 710 or the second buffer 720 described with respect to FIG. 7. The pieces of the data stream stored in the first buffer and the second buffer may be transmittable to one or more other peer clients connected to the streaming service. If an asynchronization between peers increases, used pieces stored in the second buffer may be transmitted to other peers, and the sharing ratio may increase.

The buffer size adjusting unit 1020 may dynamically adjust the size of the first buffer based on a network condition. The buffer size adjusting unit 1020 may maintain the size of the entire buffer to be constant, by reducing the size of the second buffer in an amount corresponding to the increased size of the first buffer or increasing the size of the second buffer in an amount corresponding to the reduced size of the first buffer. The network condition may include at least one of a download speed and an upload speed in a peer. The buffer size adjusting unit 1020 may adjust the size of the first buffer and the size of the second buffer based on at least one of the download speed and the upload speed. For example, the size of the first buffer may be determined in advance based on a range of at least one of the download speed and the upload speed. The buffer size adjusting unit 1020 may increase or reduce the size of the first buffer corresponding to the size determined based on at least one of a changed download speed and a changed upload speed.

The first buffer may include a first region to store pieces of a data stream received from a delivery server using the Progressive scheme that may be a piece selecting scheme for sequentially receiving pieces of a data stream, a second region to store pieces of a data stream received from at least one other peer client using the Progressive scheme, and a third region to store pieces of a data stream received from the at least one other client using the Rarest First scheme that may be a piece selecting scheme for receiving a rarest piece of a data stream first. The buffer size adjusting unit 1020 may adjust the size of the first buffer by adjusting the size of the third region, for example.

Figure 11:
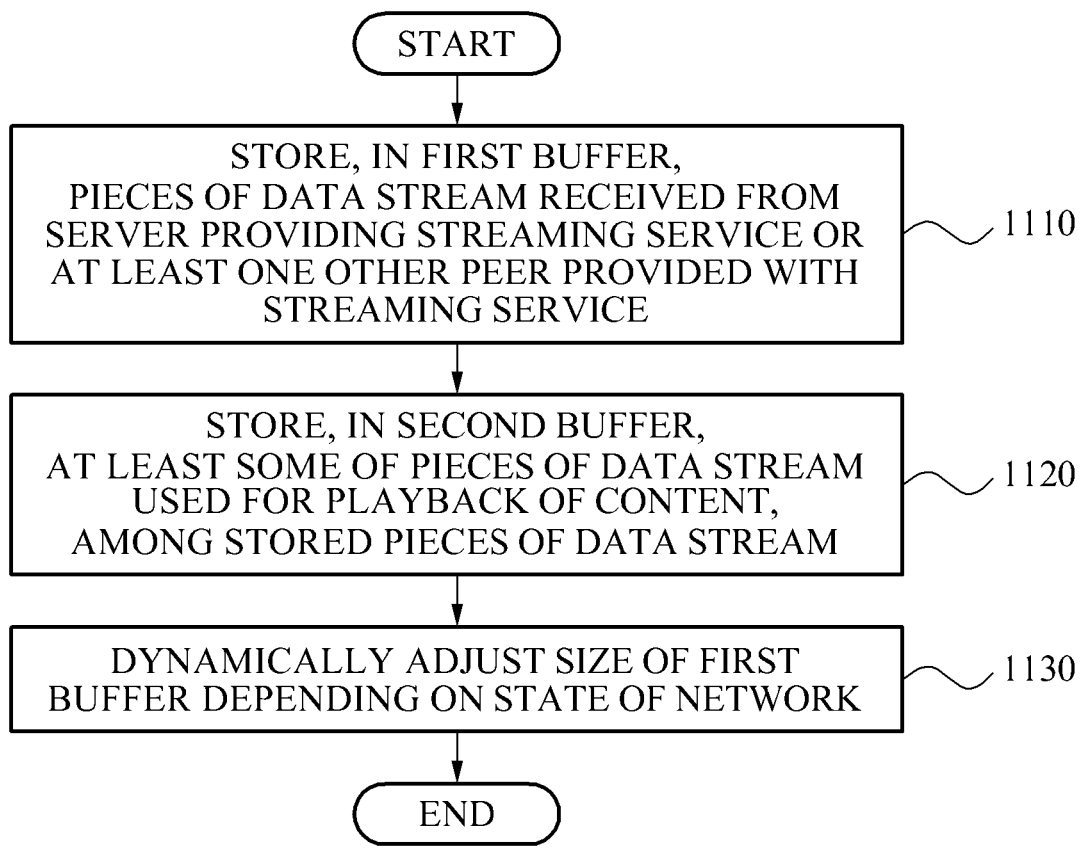
FIG. 11 is a flowchart illustrating a method for managing an adjustable buffer according to an exemplary embodiment of the present invention.

FIG. 11 is a flowchart illustrating a method for managing an adjustable buffer according to an exemplary embodiment of the present invention. FIG. 11 will be described as if performed by buffering system 1000 shown in FIG. 10, but is not limited as such.

In operation 1110, the system 1000 may store, in a first buffer, pieces of a data stream received from a server providing a P2P-based streaming service or one or more other peers connected to the P2P-based streaming service.

In operation 1120, the system 1000 may store, in a second buffer, one or more used pieces of the data stream for playback of a content, among the stored pieces of the data stream. The pieces of the data stream stored in the first buffer and the second buffer may be provided to at least one other peer client connected to the P2P-based streaming service.

In operation 1130, the system 1000 may dynamically adjust the size of the first buffer based on a network condition. The system 1000 may adjust the size of the entire buffer to be constant, by reducing the size of the second buffer in an amount corresponding to the increased size of the first buffer or increasing the size of the second buffer in an amount corresponding to the reduced size of the first buffer. The network condition may include at least one of a download speed and an upload speed in a peer. Further, the system 1000 may adjust the size of the first buffer and the size of the second buffer based on at least one of the download speed and the upload speed. For example, the size of the first buffer may be determined in advance based on a range of at least one of the download speed and the upload speed. The system 1000 may increase or reduce the size of the first buffer corresponding to the size determined based on at least one of a changed download speed and a changed upload speed.

Further, the first buffer may include a first region to store pieces of a data stream received from a delivery server using Progressive scheme that may be a piece selecting scheme for sequentially receiving pieces of a data stream, a second region to store pieces of a data stream received from at least one other peer client using the Progressive scheme, and a third region to store pieces of a data stream received from the at least one other peer client using Rarest First scheme that may be a piece selecting scheme for receiving a rarest piece of a data stream first. The system 1000 may adjust the size of the first buffer by adjusting the size of the third region, for example.

The buffering method may be performed by an application, installed in a client terminal, to execute the steps of the buffering system 1000. Further, a system to distribute the application to a client may be included in a P2P-based streaming system or may correspond to a system associated with the P2P-based streaming system.

The application may be executed in the client so that pieces of a data stream received from a P2P-based streaming server or at least one other peer are to be stored in a first buffer, and at least some of used pieces of the data stream for playback of a content, among the stored pieces of the data stream, may be stored in a second buffer by the execution of the application.

The pieces of the data stream stored in the first buffer and the second buffer may be transmittable to one or more other clients, and the size of the first buffer may be adjusted dynamically by the application based on a network condition. Further, the application may maintain the size of the entire buffer including the first buffer and the second buffer to be constant, by reducing the size of the second buffer in an amount corresponding to the increased size of the first buffer or increasing the size of the second buffer in an amount corresponding to the reduced size of the first buffer.

The first buffer may include a first region to store pieces of a data stream received from a delivery server using the Progressive that may be a piece selecting scheme for sequentially receiving pieces of a data stream, a second region to store pieces of a data stream received from at least one other client using the Progressive, and a third region to store pieces of a data stream received from the at least one other client using the Rarest First that may be a piece selecting scheme for receiving a rarest piece of a data stream first on a network. The size of the first buffer may be adjusted by dynamically adjusting the size of the third region by the application based on a network condition.

The network condition may include at least one of a download speed and an upload speed of a peer client. The size of the first buffer may be adjusted dynamically by the application depending on at least one of the download speed and the upload speed.

A server providing a streaming service may include a plurality of packetizing servers. The plurality of packetizing servers may be classified into a main packetizing server group and a sub-packetizing server group. Each group may include the same number of packetizing servers, and the sub-packetizing server group may act as a substitute for the main packetizing server group if an error occurs in the main packetizing server group.

The server providing the streaming service may include a plurality of delivery servers, and traffic may be adjusted by adjusting the number of the delivery servers determined to be used based on the number of online visitors.

The server providing the streaming service may include the plurality of packetizing servers and the plurality of delivery servers.

FIG. 12A is a diagram illustrating a buffer structure of a peer client according to an exemplary embodiment of the present invention. As shown in FIG. 12A, the buffer of peer 1 may be divided into three regions, a first region (size '2'), a second region (size '4'), and a third region (size '4'). The sizes of each region may be changed, and the buffer may be divided into two regions or four or more regions. Each region may receive assigned pieces using a determined receiving scheme from a determined source during a given time interval Ts. For example, as shown in FIG. 12A, the first region may include a first buffer space a1 and a second buffer space a2. The second region may include a third buffer space a3, a fourth buffer space a4, a fifth buffer space a5, a sixth buffer space a6, and the third region may include a seventh buffer space a7, an eighth buffer space a8, a ninth buffer space a9, a tenth buffer space a10. Peer 1 may receive corresponding pieces in parallel and store the received pieces to corresponding buffer spaces. For example, peer 1 may receive piece 1 from a delivery server DS and receive piece 3, piece 4, piece 7, piece 8, piece 10 from other peers 2, 3, and 4 during a time interval Ts (from 'T' to 'T+Ts'). If a certain number of pieces are stored in the buffer, peer 1 may start to shift pieces to the left during a time interval Ts. For example, peer 1 may output piece 1 from the first buffer space a1 and shift pieces 3, 4, 7, 8, and 10 to the left during a time interval Ts (from 'T+Ts' to 'T+2Ts'). Further, peer 1 may receive piece 2 from the delivery server DS, piece 5 from peer 5, and piece 9 from peer 6 in parallel during the time interval Ts (from 'T+Ts' to 'T+2Ts'). For example, the first region, the second region, and the third region may receive pieces using 'DS Progressive', 'peer Progressive', and 'peer Rarest First', respectively. During the time interval Ts (from 'T' to 'T+Ts'), peer 1 may receive piece 3 from peer 2 and then receive piece 4 from peer 3 since the second region uses peer Progressive scheme. Further, during the time interval Ts (from 'T' to 'T+Ts'), peer 1 may receive pieces 7, 8, and 10 from peer 4 regardless of the sequence of the piece number since the third region uses peer Rarest First scheme. In the Rarest First scheme, rarer pieces may be received before receiving more common pieces. The shifting of the buffer may be performed by various queuing methods other than the method described above.

Figure 12B:
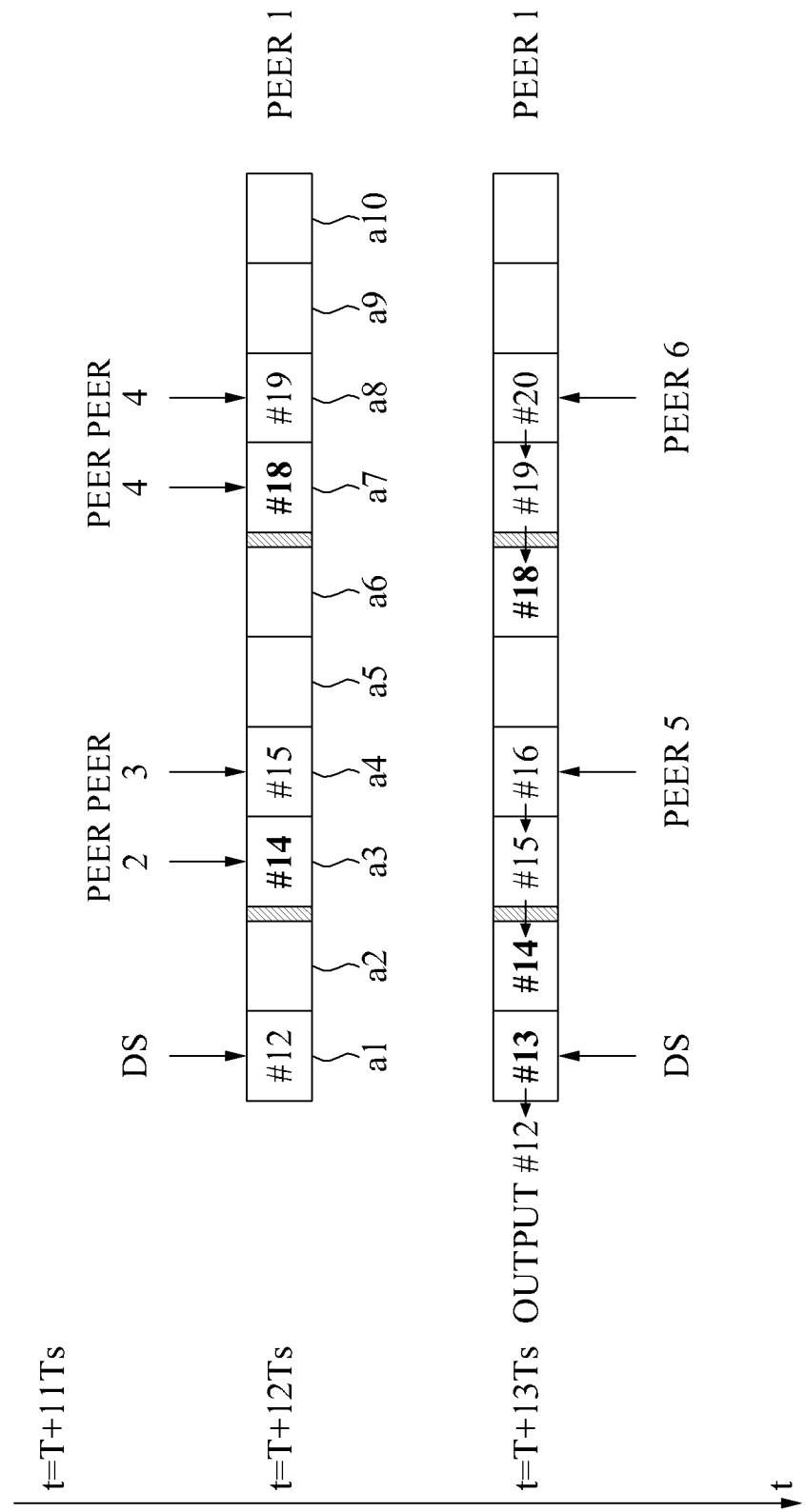
FIG. 12B is a diagram illustrating a buffer structure of a peer client according to an exemplary embodiment of the present invention.

FIG. 12B is a diagram illustrating a buffer structure of a peer client according to an exemplary embodiment of the present invention. As shown in FIG. 12B, peer 1 may receive corresponding pieces in parallel and store the received pieces to corresponding buffer spaces. For example, peer 1 may receive piece 12 from a delivery server DS and receive piece 14, piece 15, piece 18, and piece 19 from other peers 2, 3, and 4 during a time interval Ts (from 'T+11Ts' to 'T+12Ts'). Further, peer 1 may shift pieces to the left during a time interval Ts (from 'T+12Ts' to 'T+13Ts'). For example, peer 1 may output piece 12 from the first buffer space a1 and shift pieces 14, 15, 18, and 19 to the left during the time interval Ts (from 'T+12Ts' to 'T+13Ts'). Further, peer 1 may receive piece 13 from the delivery server DS, piece 16 from peer 5, and piece 20 from peer 6 in parallel during the time interval Ts (from 'T+12Ts' to 'T+13Ts'). Further, the piece receiving scheme used by the third region may have a higher priority than the piece receiving scheme used by the second region, and the piece receiving scheme used by the second region may have a higher priority than the piece receiving scheme used by the first region. If it is assumed that the first region, the second region, and the third region may receive pieces using 'DS Progressive', 'peer Progressive', and 'peer Rarest First', respectively, pieces may be requested to peers using the Rarest First scheme during the pieces are assigned in the third region. If pieces are not received during the pieces are assigned in the third region, the pieces are assigned to the second region by shifting the buffer and the pieces may be requested to peers using the Progressive scheme during the pieces are assigned in the second region. If pieces are not still received during the pieces are assigned in the second region, the pieces are assigned to the first region by shifting the buffer and the pieces may be requested to the delivery server using the Progressive scheme during the pieces are assigned in the first region. For example, as shown in FIG. 12B, pieces 18 and 19 are successfully received during the pieces 18 and 19 are assigned in the third region. Thus, pieces 18 and 19 are shifted into the second region and are not requested by the receiving schemes of the second region and the first region. Further, pieces 14 and 15 are not successfully received during the pieces 14 and 15 are assigned in the third region. Thus, pieces 14 and 15 are assigned in the second region by shifting the buffer to the left and are requested by the receiving scheme of the second region. FIG. 12B shows that pieces 14 and 15 are received from peer 2 and 3, respectively using the receiving scheme of the second region (peer Progressive, for example). Further, piece 13 is not successfully received during the piece 13 is assigned in the third region and the second region. Thus, piece 13 is assigned in the first region by shifting the buffer to the left and is requested by the receiving scheme of the first region. FIG. 12B shows that piece 13 is received from the delivery server using the receiving scheme of the first region (DS Progressive, for example).

FIG. 13 is a diagram illustrating a buffer structure of a peer client according to an exemplary embodiment of the present invention. As shown in FIG. 13, the buffer of peer 1 may be divided into three regions, a first region (size '2'), a second region (size '4'), and a third region (size '4'). The sizes of each region may be changed, and the buffer may be divided into two regions or four or more regions. As mentioned above with respect to FIG. 12A and FIG. 12B, the first region and the second region may receive assigned pieces using a determined receiving scheme from a determined source during a given time interval Ts. For example, as shown in FIG. 13, the first region may include a first buffer space a1 and a second buffer space a2, and the second region may include a third buffer space a3, a fourth buffer space a4, a fifth buffer space a5, a sixth buffer space a6. The first region and the second region may shift pieces to the left during a time interval Ts according to the queuing method described with respect to FIG. 12A. However, the third region may not shift pieces to the left (i.e., the third region may be used as a static buffer space that is, a non-queuing buffer space). For example, if pieces are received by the Rarest First scheme, received pieces may be stored vacant buffer spaces of the third region. Further, each piece stored in the third region may be transmitted to the last buffer space of the second region during the piece number of each piece stored in the third region is being assigned to the last buffer space of the second region. For example, as shown in FIG. 13, pieces 18 and 19 may be received using the Rarest First scheme during the time interval Ts (from "T'+Ts" to "T'+2Ts") and be stored in vacant buffer spaces b1 and b2, respectively. During a time interval Ts (from "T'+2Ts" to "T'+3Ts"), piece 18 may be assigned to the last buffer space of second region (i.e., the sixth region a6) and piece 18 may be retrieved from the buffer space b1 and be stored in the last buffer space of the second region Likewise, piece 19 mat be retrieved from the buffer space b2 and be stored in the last buffer space of the second region during a time interval Ts (from "T'+3Ts" to "T'+4Ts"). Thus, more rare pieces in the connected streaming channel may be requested and be stored in the third region regardless of the sequence of the index numbers. Peer 1 may receive corresponding pieces in parallel and store the received pieces to corresponding buffer spaces. For example, peer 1 may receive piece 12 from a delivery server DS and receive piece 14, piece 15, piece 18, and piece 19 from other peers 2, 3, and 4 during a time interval Ts (from "T'+Ts" to "T'+2Ts"). For example, the first region, the second region, and the third region may receive pieces using 'DS Progressive', 'peer Progressive', and 'peer Rarest First', respectively, but are not limited as such. Further, the piece receiving scheme used by the third region may have a higher priority than the piece receiving scheme used by the second region, and the piece receiving scheme used by the second region may have a higher priority than the piece receiving scheme used by the first region.

Figure 14:
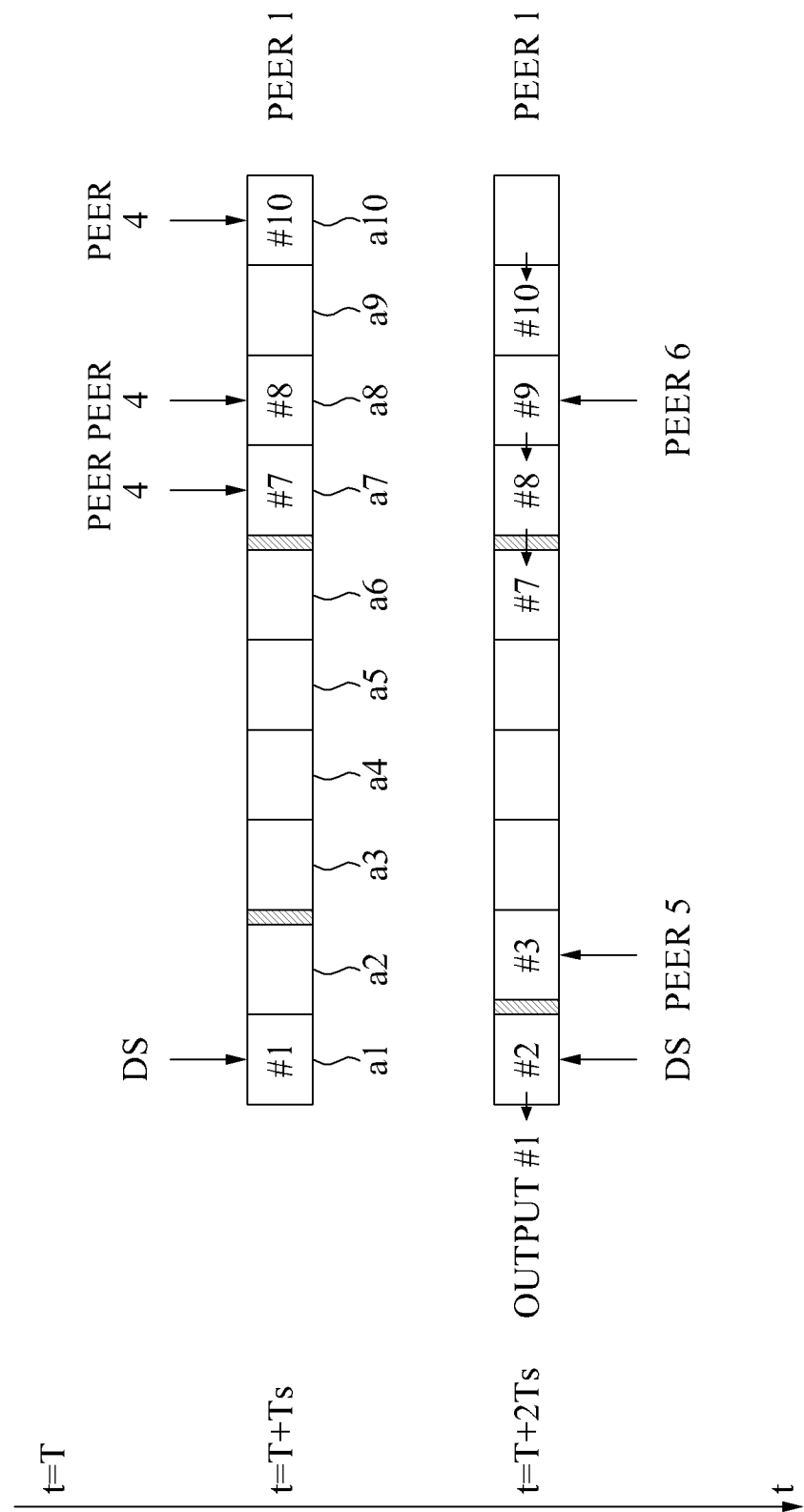
FIG. 14 is a diagram illustrating an adaptive buffer structure of a peer client according to an exemplary embodiment of the present invention.

FIG. 14 is a diagram illustrating an adaptive buffer structure of a peer client according to an exemplary embodiment of the present invention. As shown in FIG. 14, peer 1 may receive corresponding pieces in parallel and store the received pieces to corresponding buffer spaces. For example, peer 1 may receive piece 1 from a delivery server DS and receive piece 7, piece 8, and piece 10 from another peer 4 during a time interval Ts (from 'T' to 'T+Ts'). Further, peer 1 may shift pieces to the left during a time interval Ts (from 'T+Ts' to 'T+2Ts'). For example, peer 1 may output piece 1 from the first buffer space a1 and shift pieces 7, 8, and 10 to the left during the time interval Ts (from 'T+Ts' to 'T+2Ts'). Further, peer 1 may receive piece 2 from the delivery server DS, piece 3 from peer 5, and piece 9 from peer 6 in parallel during the time interval Ts (from 'T+Ts' to 'T+2Ts'). Peer 1 may receive pieces from a delivery server to store the received pieces in the first buffer space a1 and the second buffer space a2, if it is assumed that the first region, the second region, and the third region may receive pieces using 'DS Progressive', 'peer Progressive', and 'peer Rarest First', respectively. Although piece 3 is assigned in the second buffer space a2 of the first region during the time interval Ts (from 'T+Ts' to 'T+2Ts'), piece 3 may be received from other peers (i.e., peer 5) if other peers have piece 3 during the time interval Ts (from 'T+Ts' to 'T+2Ts'). Thus, sizes of the first region, the second region, and the third region may be adaptively controlled, based on piece sharing condition among delivery server and peers, to increase a piece sharing ratio and/or to decrease server usage of delivery servers.

Figure 15:
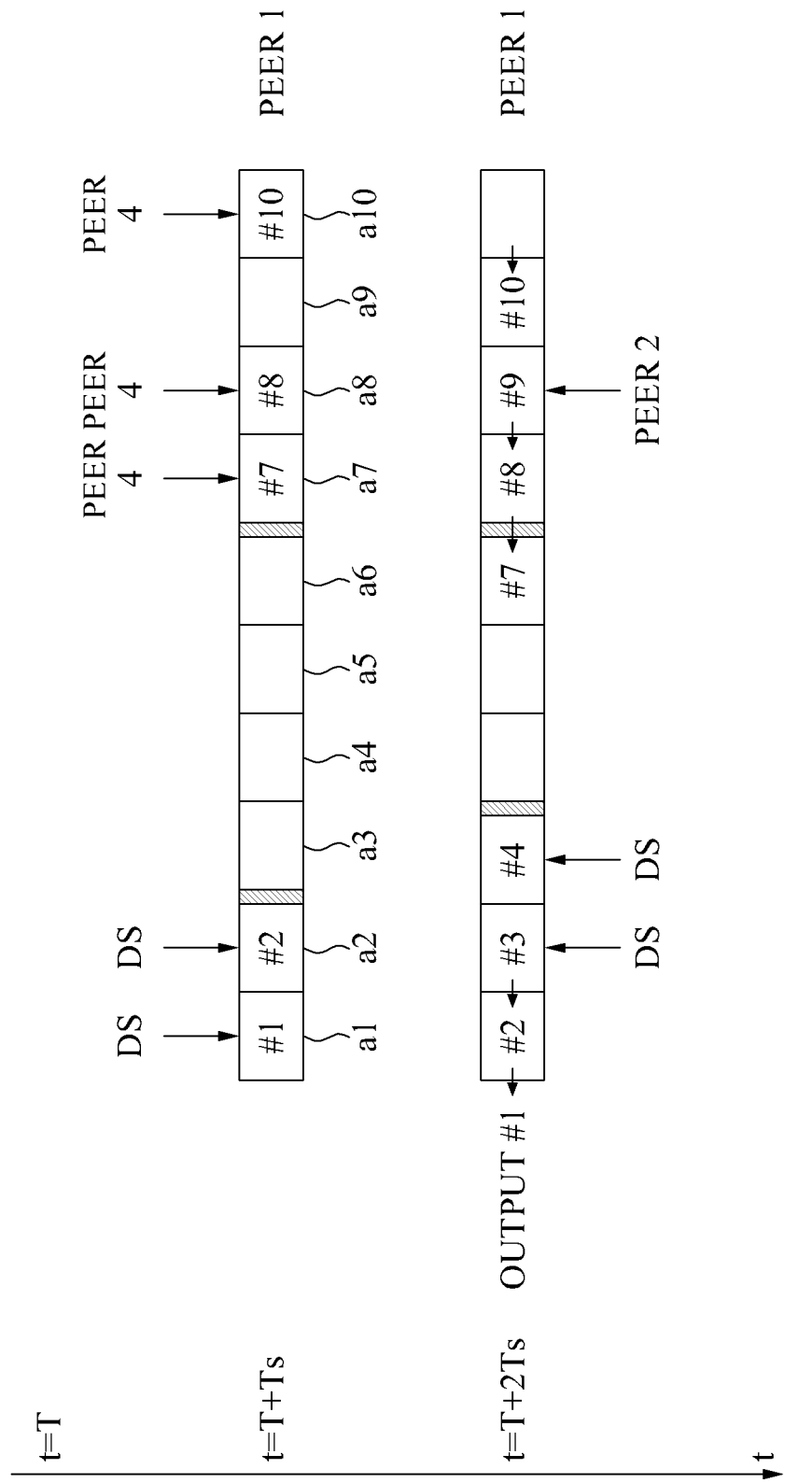
FIG. 15 is a diagram illustrating an adaptive buffer structure of a peer client according to an exemplary embodiment of the present invention.

FIG. 15 is a diagram illustrating an adaptive buffer structure of a peer client according to an exemplary embodiment of the present invention. As shown in FIG. 15, peer 1 may receive corresponding pieces in parallel and store the received pieces to corresponding buffer spaces. For example, peer 1 may receive piece 1 and piece 2 from a delivery server DS and receive piece 7, piece 8, and piece 10 from another peer 4 during a time interval Ts (from 'T' to 'T+Ts'). Further, peer 1 may shift pieces to the left during a time interval Ts (from 'T+Ts' to 'T+2Ts'). For example, peer 1 may output piece 1 from the first buffer space a1 and shift pieces 2, 7, 8, and 10 to the left during the time interval Ts (from 'T+Ts' to 'T+2Ts'). Further, peer 1 may receive piece 3 and piece 4 from the delivery server DS, and piece 9 from peer 2 in parallel during the time interval Ts (from 'T+Ts' to 'T+2Ts'). Peer 1 may receive pieces from a delivery server to store the received pieces in the first buffer space a1 and the second buffer space a2, if it is assumed that the first region, the second region, and the third region may receive pieces using 'DS Progressive', 'peer Progressive', and 'peer Rarest First', respectively. Although piece 4 is assigned in the third buffer space a3 of the second region during the time interval Ts (from 'T+Ts' to 'T+2Ts'), piece 4 may be received from the delivery server to increase streaming service quality or to increase the sharing ratio of piece 4. If piece 4 is rare among peers during the time interval Ts (from 'T+Ts' to 'T+2Ts'), it may cause streaming delays for some peers. Streaming delays may cause an asynchronization among peers and thus the sharing ratio may decrease. Furthermore, if piece 4 is transmitted from the delivery server to some peers, the sharing ratio of piece 4 may increase. Thus, sizes of the first region, the second region, and the third region may be adaptively controlled, based on a piece sharing condition among delivery server and peers, to increase a piece sharing ratio and/or to decrease server usage of delivery servers.

Figure 16:
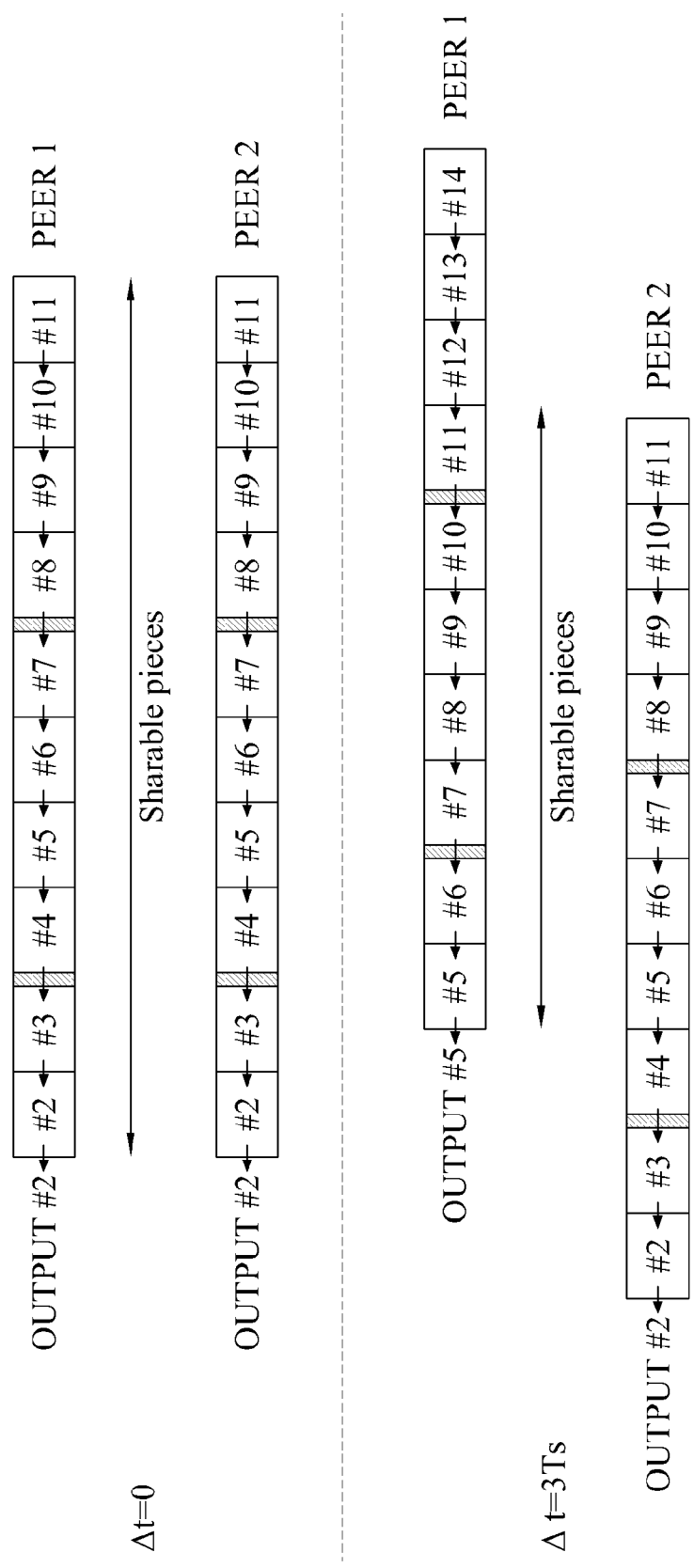
FIG. 16 is a diagram illustrating a streaming synchronization among peers according to an exemplary embodiment of the present invention.

FIG. 16 is a diagram illustrating a streaming synchronization among peers according to an exemplary embodiment of the present invention. As shown in the upper portion of FIG. 16, if streaming of pieces between peer 1 and peer 2 are more synchronized, sharable pieces between peer 1 and peer 2 increase. That is, if the difference (Δt) between index numbers of pieces outputted from peer 1 and peer 2 during the same time interval is smaller, sharable pieces between peer 1 and peer 2 increase (a higher sharing ratio). As shown in the lower portion of FIG. 16, if the difference (Δt) increases (i.e., Δt=3Ts), sharable pieces between peer 1 and peer 2 decrease (a lower sharing ratio).

Figure 17:
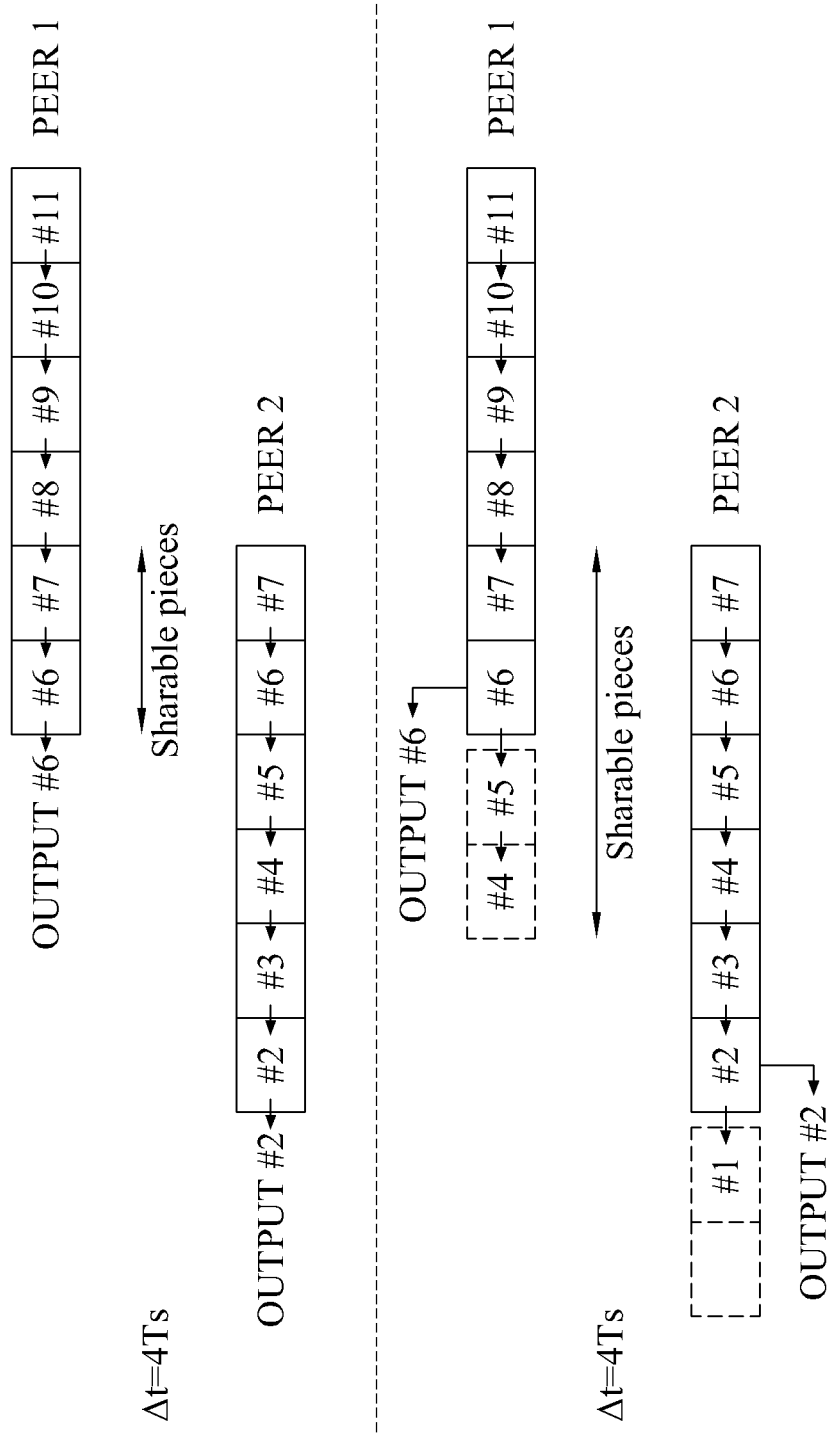
FIG. 17 is a diagram illustrating a Z-buffer structure of a peer client according to is an exemplary embodiment of the present invention.

FIG. 17 is a diagram illustrating a Z-buffer structure of a peer client according to an exemplary embodiment of the present invention. As shown in the upper portion of FIG. 17, if peer 1 outputs piece 6 and peer 2 outputs piece 2 in a given time interval because of the timing difference of play back, sharable pieces between peer 1 and peer 2 may decrease (for example, piece 6 and piece 7). Pieces 8, 9, 10, and 11 may not be sharable since the buffer of peer 2 may not have enough space to receive the latter pieces, pieces 8, 9, 10, and 11. Further, peer 2 may not receive pieces 2, 3, 4, and 5 from peer 1, if peer 1 discard pieces outputted from the buffer for play back. To increase a sharing ratio between asynchronized peers, each peer may have a Z-buffer to store used pieces for sharing. The used pieces may be pieces used for play back the corresponding content. As shown in the lower portion of FIG. 17, piece 5 outputted from a progressive buffer may be stored in the Z-buffer and be used for play back of the content. Thus, pieces stored in the Z-buffer may be transmitted to peer 2 and thus, sharing ratio between peer 1 and peer 2 may increase. Used pieces to be stored in the Z-buffer may be stored using progressive scheme or Rarest First scheme. Further, pieces stored in the Z-buffer may be shifted by the queuing method described with respect to FIG. 12A and FIG. 12B, or the Z-buffer may be used as a static buffer space that is, a non-queuing buffer space.

According to exemplary embodiments of the present invention, the sharing ratio of data pieces among peers may not decrease, by buffering some pieces that are already used for playback of a content in a buffer even though a synchronization between peers fails. Further, the size of a buffer to store pieces of a data stream may be adjusted based on a network condition. Further, the size of an entire buffer may be maintained to be constant, by dynamically increasing the size of a buffer in an amount corresponding to the reduced size of another buffer used to buffer pieces used for playback of a content, or by dynamically reducing the size of the buffer in an amount corresponding to the increased size of the other buffer used to buffer pieces used for playback of a content.

The methods according to the exemplary embodiments of the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system to manage buffering of a data stream for a peer client in a peer-to-peer based streaming service, comprising:
a processor configured to,
buffer unused pieces of the data stream in at least two regions of a first buffer of the peer client prior to playback of the unused pieces by the peer client such that (i) the unused pieces of the data stream received from a delivery server are stored in a first region of the at least two regions of the first buffer and (ii) the unused pieces of the data stream received from at least one other peer client are stored in a second region of the at least two regions of the first buffer, each of the at least two regions being configured to store pieces of the data stream that are received according to different piece receiving schemes,
shift the unused pieces of the data stream out of the first buffer as outputted pieces for playback thereof by the peer client,
store a number of the outputted pieces of the data stream in a second buffer as used pieces of the data stream, the used pieces of the data stream being ones of the outputted pieces that have been played by the peer client,
determine whether the peer client and the at least one other peer client are asynchronous,
selectively transmit, via a communications unit, the used pieces to one of the at least one other peer client as transmitted pieces when the processor determines that the peer client and the at least one other peer client are asynchronous such that a piece sharing ratio amongst peer clients in the peer-to-peer based streaming service increases, and
dynamically adjust a size of the first region of the first buffer relative to a size of the second region of the first buffer based on a network condition of the peer-to-peer based streaming service such that the size of the second region storing the unused pieces of the data stream received from the at least one other peer client is adjusted and the size of the first region storing the unused pieces of the data stream received from the delivery server is adjusted if the network condition worsens between the peer client and the at least one other peer client, wherein
the second buffer is configured to store rarely used pieces of the data stream, and
the rarely used pieces are the pieces of the data stream played less than a threshold number of times within a period of time.

2. The system of claim 1, wherein the processor is configured to adjust the size of the first buffer and the size of the second buffer to maintain the size of the first buffer and the size of the second buffer to be constant.

3. A system to manage buffering of a data stream for a peer client in a peer-to-peer based streaming service, comprising:
a processor configured to,
buffer unused pieces of the data stream in one of three regions of a first buffer of the peer client prior to playback of the unused pieces by the peer client such that (i) the unused pieces of the data stream received from a delivery server are stored in a first region of the three regions of the first buffer using a first piece receiving scheme and (ii) the unused pieces of the data stream received from at least one other peer client are stored in one of a second region of the three regions of the first buffer using the first piece receiving scheme or in a third region of the three regions of the first buffer using a second piece receiving scheme,
shift the unused pieces of the data stream out of the first buffer as outputted pieces for playback thereof by the peer client,
store a number of the outputted pieces of the data stream in a second buffer associated with the peer client as used pieces of the data stream, the used pieces of the data stream being ones of the outputted pieces that have been played by the peer client,
determine whether the peer client and the at least one other peer client are asynchronous, and
selectively transmit the used pieces to one of the at least one other peer client as transmitted pieces when the processor determines that the peer client and the at least one other peer client are asynchronous such that a piece sharing ratio amongst peer clients in the peer-to-peer based streaming service increases, wherein
the second buffer is configured to store rarely used pieces of the data stream, and
the rarely used pieces are the pieces of the data stream played less than a threshold number of times within a period of time.

4. The system of claim 3, wherein the processor is further configured to,
adjust a size of the first buffer by dynamically adjusting a size of at least one of the first region, second region, and the third region based on a network condition of the peer-to-peer based streaming service, and
adjust the size of the third region of the first buffer relative to a size of the second buffer such that the size of the third region of the first buffer is adjusted and the size of the second buffer is adjusted when the piece sharing ratio between the peer client and the at least one other peer client changes.

5. The system of claim 1, wherein
the network condition includes at least one of a download speed and an upload speed of the peer client, and
the processor is configured to adjust the size of the first buffer dynamically based on at least one of the download speed and the upload speed.

6. A method for managing a buffeting of a data stream in a peer-to-peer based streaming service, the method comprising:
storing unused pieces of the data stream in at least two regions of a first buffer of a peer client prior to playback of the unused pieces by the peer client such that (i) the unused pieces of the data stream received from a delivery server are stored in a first region of the at least two regions of the first buffer and (ii) the unused pieces of the data stream received from at least one other peer client are stored in a second region of the at least two regions of the first buffer;
shifting the unused pieces of the data stream out of the first buffer as outputted pieces for playback thereof by the peer client;
storing a number of the outputted pieces of the data stream in a second buffer of the peer client as used pieces of the data stream, the used pieces of the data stream being ones of the outputted pieces that have been played by the peer client;

determining whether the peer client and the at least one other peer client are asynchronous;

transmitting the used pieces stored in the second buffer to one of the at least one other peer client when the peer client and the at least one other peer client are asynchronous such that a piece sharing ratio amongst peer clients in the peer-to-peer based streaming service increases; and dynamically adjusting a size of the first buffer or a size of the second buffer based on a network condition, wherein the second buffer is configured to store rarely used pieces of the data stream, and the rarely used pieces are the pieces of the data stream played less than a threshold number of times within a period of time.

7. The method of claim 6, further comprising:

adjusting the size of the first buffer and the size of the second buffer to maintain a size of an entire buffer including the first buffer and the second buffer to be constant.

8. The method of claim 6, wherein the first region is configured to store first pieces of the data stream received from the delivery server using a progressive scheme, and the second region is configured to store second pieces of the data stream received from another peer client using the progressive scheme or a rarest first scheme; and the first buffer further comprises:

a third region configured to store third pieces of the data stream using the rarest first scheme.

9. The method of claim 8, further comprising:

adjusting the size of the first buffer by dynamically adjusting a size of at least one of the first region, the second region, and the third region based on the network condition.

10. The method of claim 6, wherein the network condition comprises at least one of a download speed and an upload speed of the peer client.

11. A non-transitory computer-readable medium comprising a program for instructing a computer, when executed by a processor, to perform the method of claim 6.

12. A terminal to manage a buffering of a data stream in a peer-to-peer based streaming service, comprising:

a processor configured to, buffer unused pieces of the data stream in at least two regions of a first buffer of the terminal prior to playback of the unused pieces by the terminal such that (i) the unused pieces of the data stream received from a delivery server are stored in a first region of the at least two regions of the first buffer and (ii) the unused pieces of the data stream received from at least one other terminal are stored in a second region of the at least two regions of the first buffer, each of the at least two regions being configured to store pieces of the data stream that are received according to different piece receiving schemes, shift the unused pieces of the data stream out of the first buffer as outputted pieces for playback thereof by the terminal, store a number of the outputted pieces of the data stream in a second buffer associated with the terminal as used pieces of the data stream, the used pieces of the data stream being ones of the outputted pieces that have been played by the terminal, determine whether the terminal and the at least one other terminal are asynchronous, and adjust a size of the first buffer dynamically based on a network condition of the peer-to-peer based streaming service; and a communication unit configured to, transmit one or more pieces stored in the first buffer to at least one other terminal, and transmit the used pieces stored in the second buffer to the at least one other terminal as transmitted pieces when the terminal and the at least one other terminal are asynchronous such that a piece sharing ratio amongst terminals in the peer-to-peer based streaming service increases, wherein the second buffer is configured to store rarely used pieces of the data stream, and the rarely used pieces are the pieces of the data stream played less than a threshold number of times within a period of time.

13. The terminal of claim 12, wherein the first region is configured to store first pieces of the data stream received from the delivery server using a progressive scheme, and the second region is configured to store second pieces of the data stream received from the at least one other terminal using the progressive scheme; and the first buffer further comprises:

a third region configured to store third pieces of the data stream received from the at least one other terminal using a rarest first scheme.

14. The terminal of claim 13, wherein the processor is configured to adjust a size of the first buffer or a size of the second buffer, and the size of the first buffer is adjusted by dynamically adjusting sizes of the first region, the second region, or the third region based on a network condition.

15. The terminal of claim 13, wherein the processor is configured to adjust a size of the first buffer and a size of the second buffer to maintain a size of an entire buffer including the first buffer and the second buffer to be constant.

16. The terminal of claim 14, wherein the communication unit is configured to receive the first pieces of the data stream from the delivery server, and the processor is configured to control a number of the first pieces received from the delivery server by adjusting a size of at least one of the first region, the second region, and the third region.

17. The system of claim 1, wherein the first region is configured to store first pieces of the data stream received from the delivery server using a progressive scheme, and the second region is configured to store second pieces of the data stream received from the at least one other peer client using the progressive scheme or a rarest first scheme; and the first buffer further comprises:

a third region configured to store third pieces of the data stream using the rarest first scheme.

18. The system of claim 17, wherein, the progressive scheme includes receiving pieces in a sequential order, and the rarest first scheme includes receiving pieces that are identified as being rare pieces before receiving pieces that are identified as being common pieces.

19. The system of claim 17, wherein the processor is further configured to:

output the first pieces of the data stream from the first region of the first buffer for playback during a desired time period;

shift the second pieces of the data stream from the second region into the first region during the desired time period;

shift the third pieces of the data stream from the third region into the second region during the desired time period; and control additional pieces of the data stream to be buffered in at least one of the second region and the third region during the desired time period, the additional pieces of the data stream being received during the desired time period.

20. The system of claim 1, wherein the processor is further configured to adjust the size of the second region of the first buffer relative to a size of the second buffer such that the size of the second region of the first buffer is adjusted and the size of the second buffer is adjusted when the piece sharing ratio between the peer client and the at least one other peer client changes.

* * * * *